US012795042B2

(12) United States Patent
Kim et al.

(10) Patent No.: US 12,795,042 B2
(45) Date of Patent: Nov. 10, 2026

(54) SYSTEMS AND METHODS FOR MOUNTING DEVICES TO A FLAT SCREEN VIDEO MONITOR

(71) Applicant: Vizio, Inc., Irvine, CA (US)

(72) Inventors: Glen Gihong Kim, Anaheim, CA (US); Kasin Chan, Chino, CA (US)

(73) Assignee: VIZIO, INC., Irvine, CA (US)

( * ) Notice: Subject to any disclaimer, the term of this patent is extended or adjusted under 35 U.S.C. 154(b) by 392 days.

(21) Appl. No.: 18/240,700

(22) Filed: Aug. 31, 2023

(65) Prior Publication Data

US 2024/0073356 A1 Feb. 29, 2024

Related U.S. Application Data

(60) Provisional application No. 63/402,522, filed on Aug. 31, 2022.

(51) Int. Cl.
*H04N 5/64* (2006.01)
*H04R 5/02* (2006.01)

(52) U.S. Cl.
CPC ............... *H04N 5/642* (2013.01); *H04R 5/02* (2013.01); *H04R 2499/15* (2013.01)

(58) Field of Classification Search
CPC ....... H04N 5/642; H04R 5/02; H04R 2499/15
(Continued)

(56) References Cited

U.S. PATENT DOCUMENTS 6,305,892 B1 * 10/2001 Qiao ...................... H04R 1/025 411/510
8,879,761 B2 11/2014 Johnson et al.
(Continued)

FOREIGN PATENT DOCUMENTS

KR 1020050117799 A 6/2007
KR 1020210187959 B1 1/2023

OTHER PUBLICATIONS

English translation of KR1020050117799 from Total Patent.
English translation of KR1020210187959 from Total Patent.

*Primary Examiner* — Thjuan K Addy
(74) *Attorney, Agent, or Firm* — DICKINSON WRIGHT RLLP; Hector A. Agdeppa

(57) ABSTRACT

An audio visual system includes a video display, such as a TV, and a soundbar. The soundbar is snap-fittingly attachable with the video display. Thumbscrews are attached to a bottom surface of the video display and are spaced apart along a width axis of the video display. The soundbar has a top panel with elongated channels that are spaced apart from one another along a length axis of the soundbar. Spring-biased members comprising various geometric shapes are located in the channels. The soundbar is installed on the video display by aligning each of the thumbscrews with a respective channel such that the thumbscrew heads are located in the channel and beneath the upper surface of the top panel of the soundbar. To install the soundbar, the thumbscrews are positioned within a respective one of the elongated channels. As the soundbar is pushed toward the rear of the video display along the display's thickness axis, the thumbscrews each displace a respective one of the spring-biased members, thereby pushing it away from its corresponding retaining surface. When the thumbscrews reach the end of the channels, the soundbar is released, and the spring-biased members lock the thumbscrews in place on the soundbar. The movement of the spring-loaded caps may produce an audible "click" to indicate that the soundbar is secured to the display.

20 Claims, 25 Drawing Sheets

(58) Field of Classification Search
USPC ................................ 381/388, 301, 306, 333
See application file for complete search history.

(56) References Cited

U.S. PATENT DOCUMENTS

| | | | | |
|---|---|---|---|---|
| 10,779,083 | B2 | 9/2020 | Stead et al. | |
| 11,277,703 | B2 | 3/2022 | Crockett et al. | |
| 2002/0172391 | A1* | 11/2002 | Ogawa .................. | H04R 1/025 381/386 |
| 2011/0186705 | A1* | 8/2011 | Ke ........................ | H04R 1/026 248/220.21 |
| 2020/0221217 | A1 | 7/2020 | Kim et al. | |
| 2021/0076117 | A1 | 3/2021 | Winton et al. | |
| 2022/0232188 | A1 | 7/2022 | Kim et al. | |
| 2023/0209231 | A1 | 6/2023 | Plummer et al. | |
| 2023/0209297 | A1 | 6/2023 | Li et al. | |

* cited by examiner

SYSTEMS AND METHODS FOR MOUNTING DEVICES TO A FLAT SCREEN VIDEO MONITOR

CROSS-REFERENCE TO RELATED APPLICATIONS

This application claims the benefit of U.S. Provisional Patent Application No. 63/402,522, filed on Aug. 31, 2022, the entirety of which is hereby incorporated by reference.

TECHNICAL FIELD

This disclosure relates generally to securely and conveniently mounting certain consumer electronic devices such as sound bars to other devices such as flatscreen televisions or to other potential supports without the use of tools.

BACKGROUND

A smart TV is an internet-connected television that offers a range of online features, such as on-demand content from apps and access to streaming services, as well as the ability to connect other wireless devices to the smart television. However, due to their thin front-to back-dimensions, flatscreen televisions generally do not come with significant internal audio speakers. Hence, a standalone speaker system, usually called a "soundbar", has become a popular accessory to enhance the TV's audio output. The mounting of such soundbars is typically done underneath or on top of the host flat screen TV after the TV is mounted on a wall; usually by using brackets and screws to secure the soundbar. This step requires tools and skills that not all prospective users will have, and the semi-permanent mounting of additional electronics to an interior wall may damage the wall's surface.

SUMMARY

Methods and systems are described herein for providing a novel "push-and-click" fastening system that is built into a sound bar, thus enabling the quick and simple attachment of a soundbar to a smart TV. Fasteners projecting away from a bottom surface of the TV are slid into channels formed in the upper surface of the sound bar to move biasing elements such as spring loaded caps, balls, plungers, etc. The channels are structured such that at the end of the channel, the fastener disengages the biasing element, allowing the biasing element to lock the fastener into place in the channel, and hence, locking the soundbar into place on the smart TV.

The means of attaching a soundbar or other useful attachments, such as a utility shelf or even a video game console is achieved with a simple mechanism of, in one embodiment, two thumbscrews screwed into the bottom of the TV frame. A soundbar or other device is constructed with two slots along the top surface of the device that match the spacing of the thumb screws. The two slots have respective springs or other biasing devices that bias respective a movable engagement surfaces into engagement with a retaining surface defined in the upper surface of the soundbar housing when no soundbar is attached. To install the soundbar on the TV, the soundbar the soundbar is pushed upward so that the thumb screws bias their respective biasing elements in a direction away from their respective retaining surfaces, allowing the underside of the thumbscrew heads to be slid underneath their respective retaining surfaces and secured into place between the retaining surface and the engagement surface, thereby making an audible "click" sound. To remove the soundbar from the TV, the soundbar is pushed upward to disengage the thumbscrew heads from their respective retaining surfaces, allowing the user to slide the soundbar away from the screw and the TV frame. screws.

These illustrative examples are mentioned not to limit or define the disclosure, but rather to aid understanding thereof.

BRIEF DESCRIPTION OF THE DRAWINGS

Features, embodiments, and advantages of the present disclosure are better understood when the following Detailed Description is read with reference to the accompanying drawings.

DETAILED DESCRIPTION

The ability to mount devices or accessories to the bottom of a TV without requiring special brackets or tools is an advantage for the ordinary household by simplifying the process of adding improvements and other useful extensions. It furthermore makes popular accessories more attractive by removing the installation barrier and, hence, improves sales.

Figure 1:
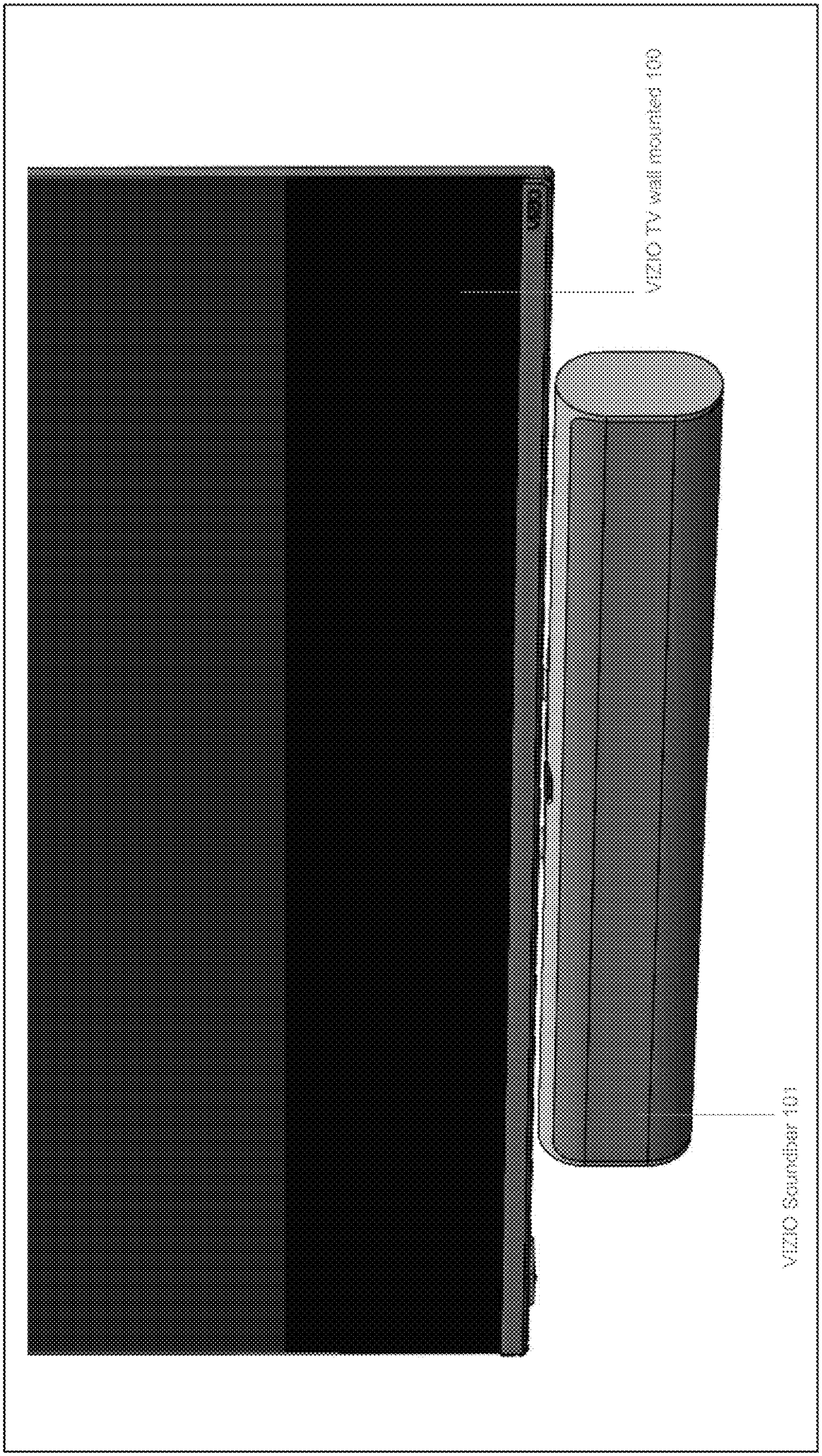
FIG. 1 illustrates a flat screen TV equipped with a two-thumbscrew mounting system compatible with the novel soundbar fastening system disclosed herein.
Figure 2:
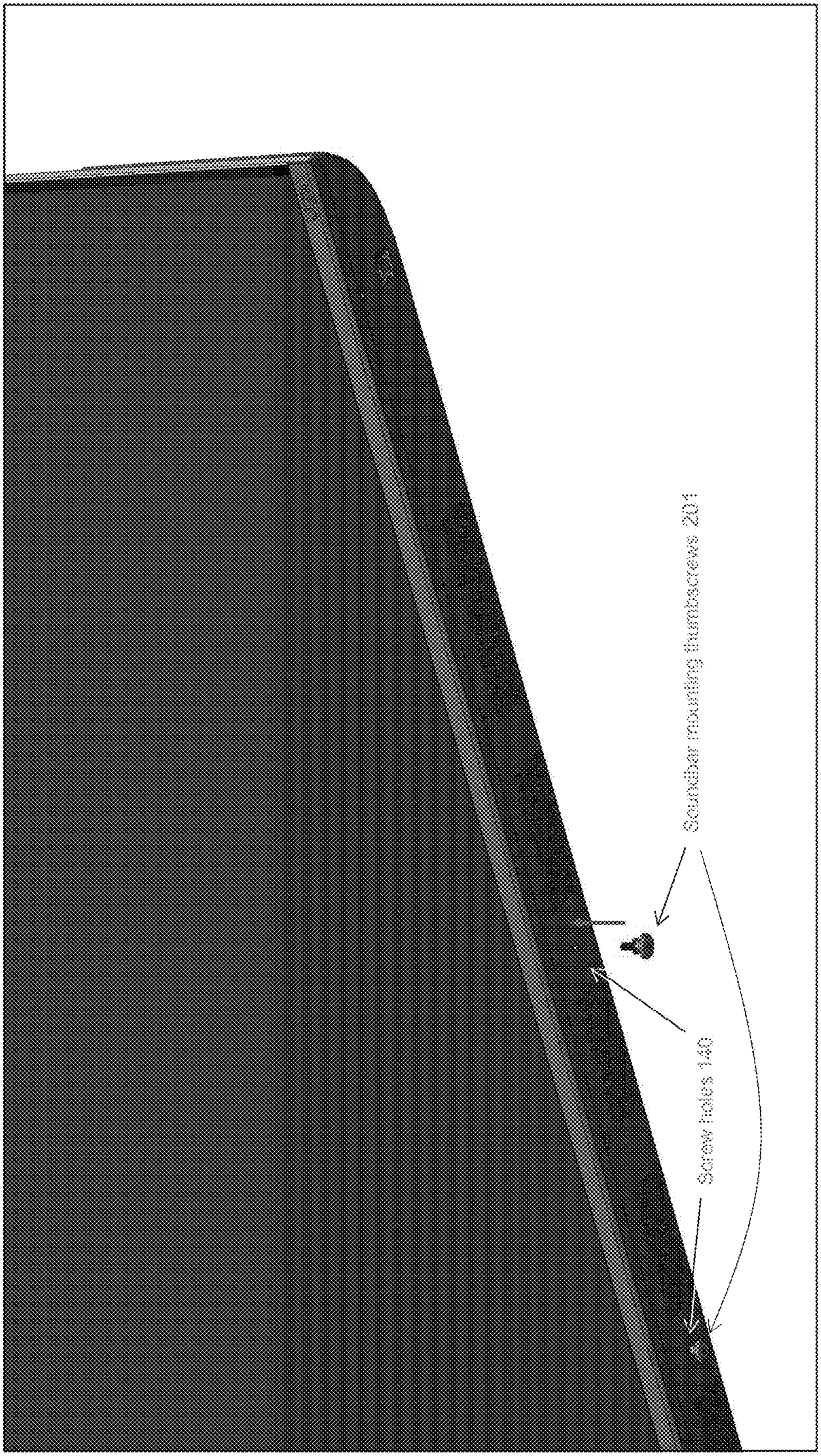
FIG. 2 shows the bottom perspective view of the flat screen TV showing the two-thumbscrew mounting locations on the bottom surface of the TV.

As shown in FIGS. 1-2, flat screen TV 100 includes a bottom surface with two screw holes 140 spaced apart along a width axis of the TV 100 for the placement of thumbscrews.

Figure 3:
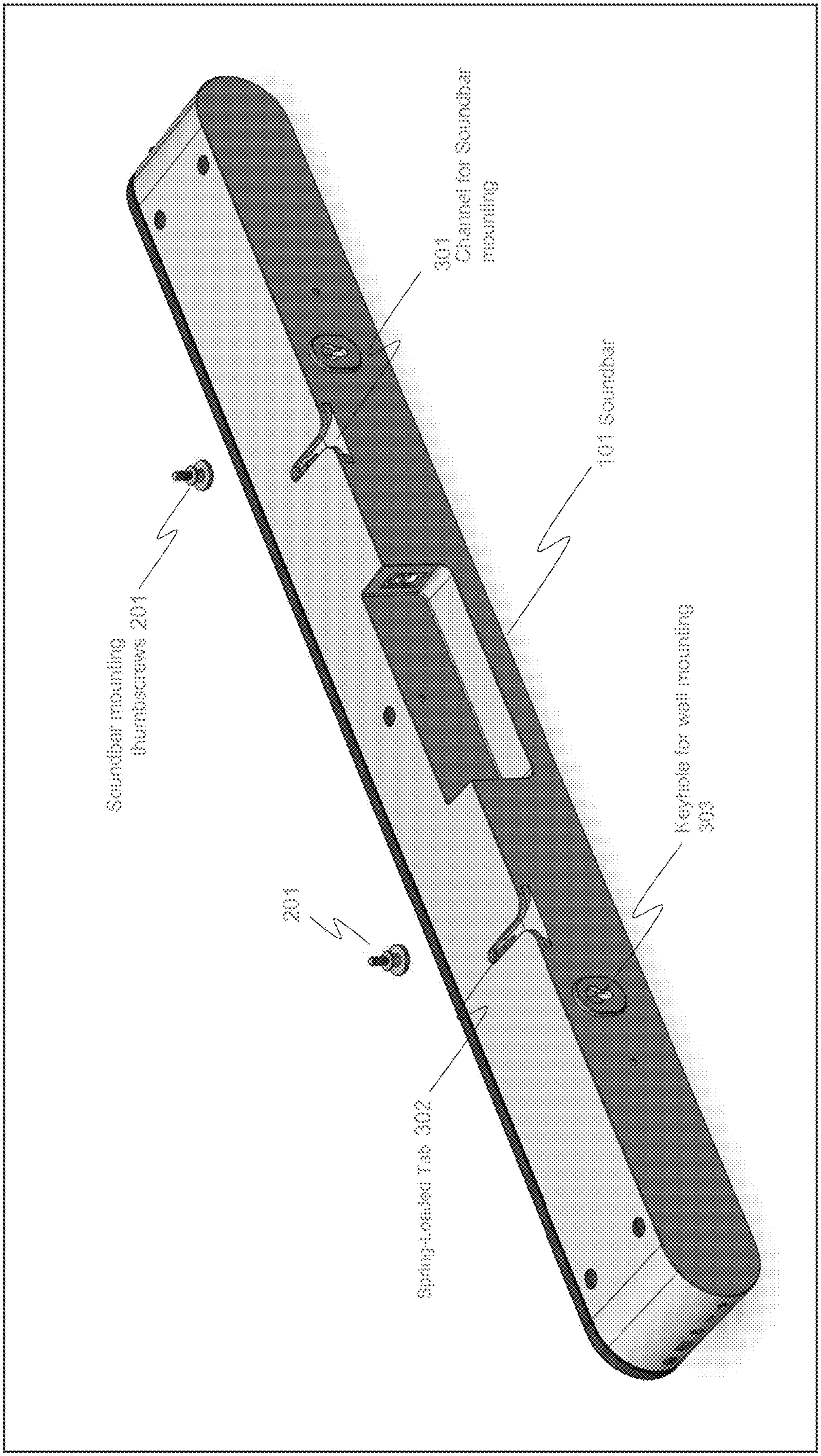
FIG. 3 illustrates the first of five embodiments of a compatible soundbar with dual mounting slots.

FIG. 3 shows the top of a soundbar 101 of the first embodiment designed to engage the two thumbscrews 201. There are two channels 301 that are spaced apart from one another along a length axis of the soundbar 101. The channels 301 are sized to mate with the heads of a respective one of the thumbscrews 201 by aligning the slots with the respective one of the thumbscrews 201 at respective channel openings located at the rear portion of the top surface of soundbar 101 and pushing the soundbar toward the rear of the TV 100. Pushing the soundbar 101 toward the rear of TV 100 will cause the heads of each of the thumbscrews 201 to engage a respective spring-loaded pressure tabs 302 that is fit over a respective biasing spring 404. The continued movement of the soundbar 101 toward the rear of TV 100 (along the thickness axis of the TV 100) will position the thumbscrew 201 cap in the recess at the end of the top guide 401 defined by the top of the soundbar 101, thereby allowing the undersides of the heads of the thumbscrews 201 to be secured between their respective pressure tabs 302 and retaining surfaces 401. The movement of the pressure tabs 302 preferably produces an audible "click" to indicate that the soundbar 101 is attached to the TV 100.

Figure 4:
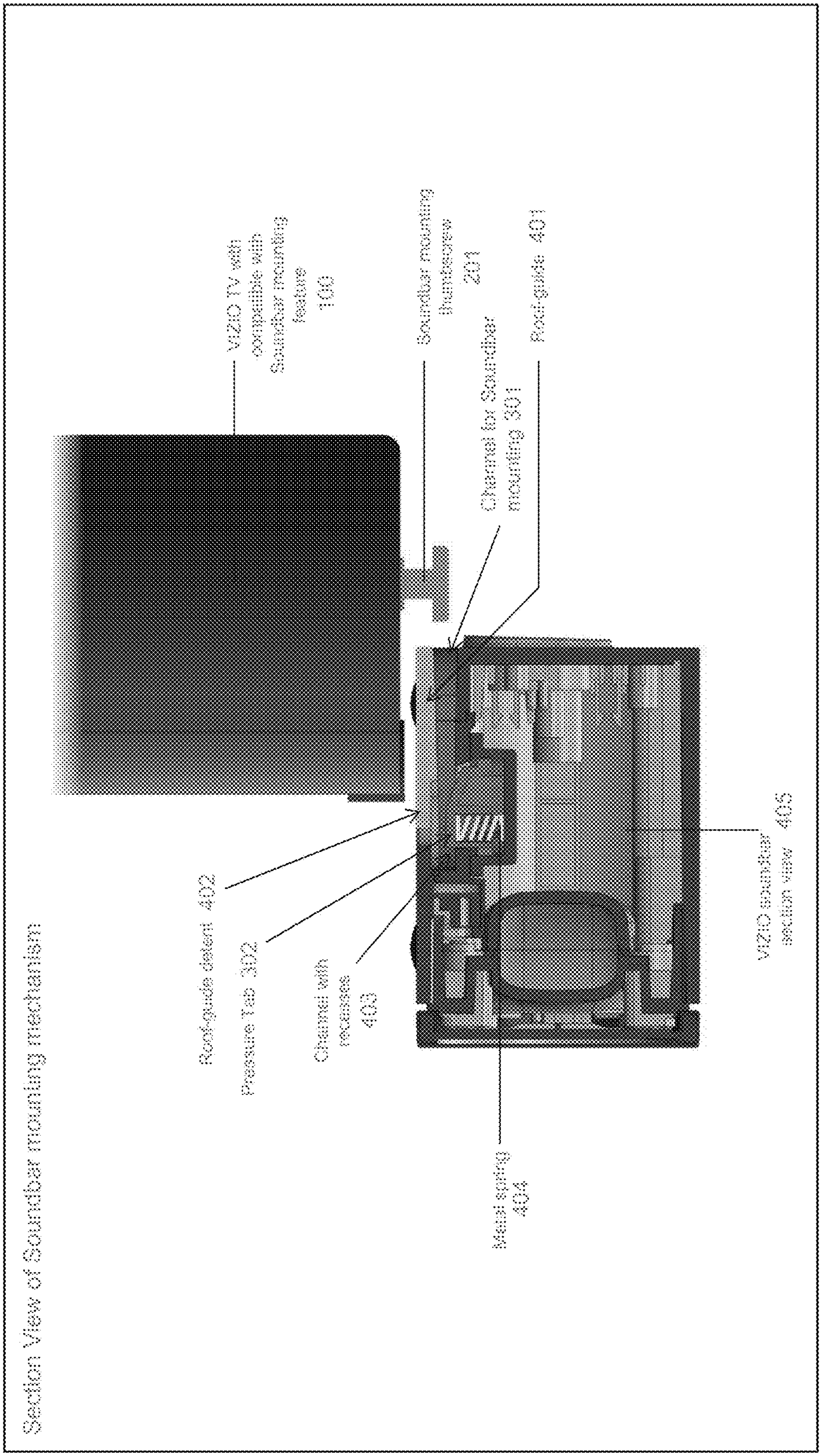
FIG. 4 shows a cross-sectional cut-away view of the disclosed spring-loaded mounting screw capture and locking system.
Figure 5:
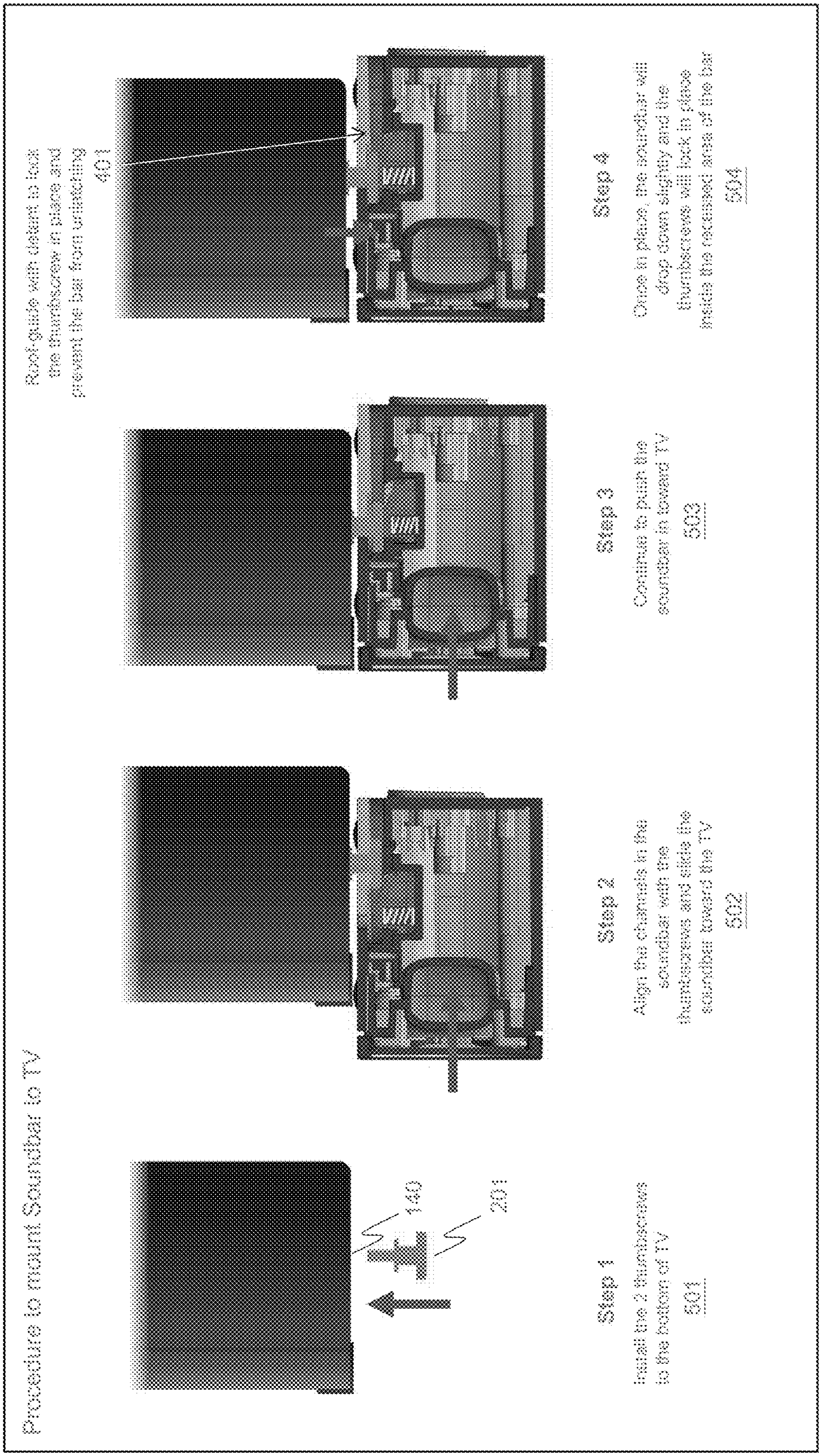
FIG. 5 illustrates the process of the soundbar capturing the thumbscrews during a soundbar attachment operation.

The retention mechanism defined by thumbscrews 201, channels 301, pressure tabs 302, and biasing springs 404 allows both secure installation and simple removal of a device utilizing the mounting system without the need of tools. In FIG. 4, a soundbar section view 405 illustrates the mechanical system of the mounting retention mechanism. One of the mounting thumbscrews 201 is aligned with a corresponding one of the mounting channels 301 and the soundbar 101 is then pushed along the channel 301, as illustrated in Step 2 of FIG. 5, until encountering detent 402 along the end segment of roof-guide 401, a spring-loaded pressure tab 302 then pushes up on the thumbscrew 201 holding it in place within the detent 402 at the end of roof-guide 401. Additional pressure will depress the pressure tab 302 away from the bottom of TV 100 while compressing a respective metal spring 404, as shown in Step 3 of FIG. 5. As thumbscrew 201 reaches channel recess 403, the pressure tab 302 will push the thumbscrew up into recess 403 and against retaining surface 402. A detent region 402 in roof-guide 401 in which the channels 301 are defined engages the head of the thumbscrews preventing the soundbar 101 from being slid in reverse direction along the TV 100 thickness axis unless the pressure tabs 302 are first depressed away from the retaining surfaces 402 along the TV 100 height axis as illustrated in Step 4 of FIG. 5.

Figure 6:
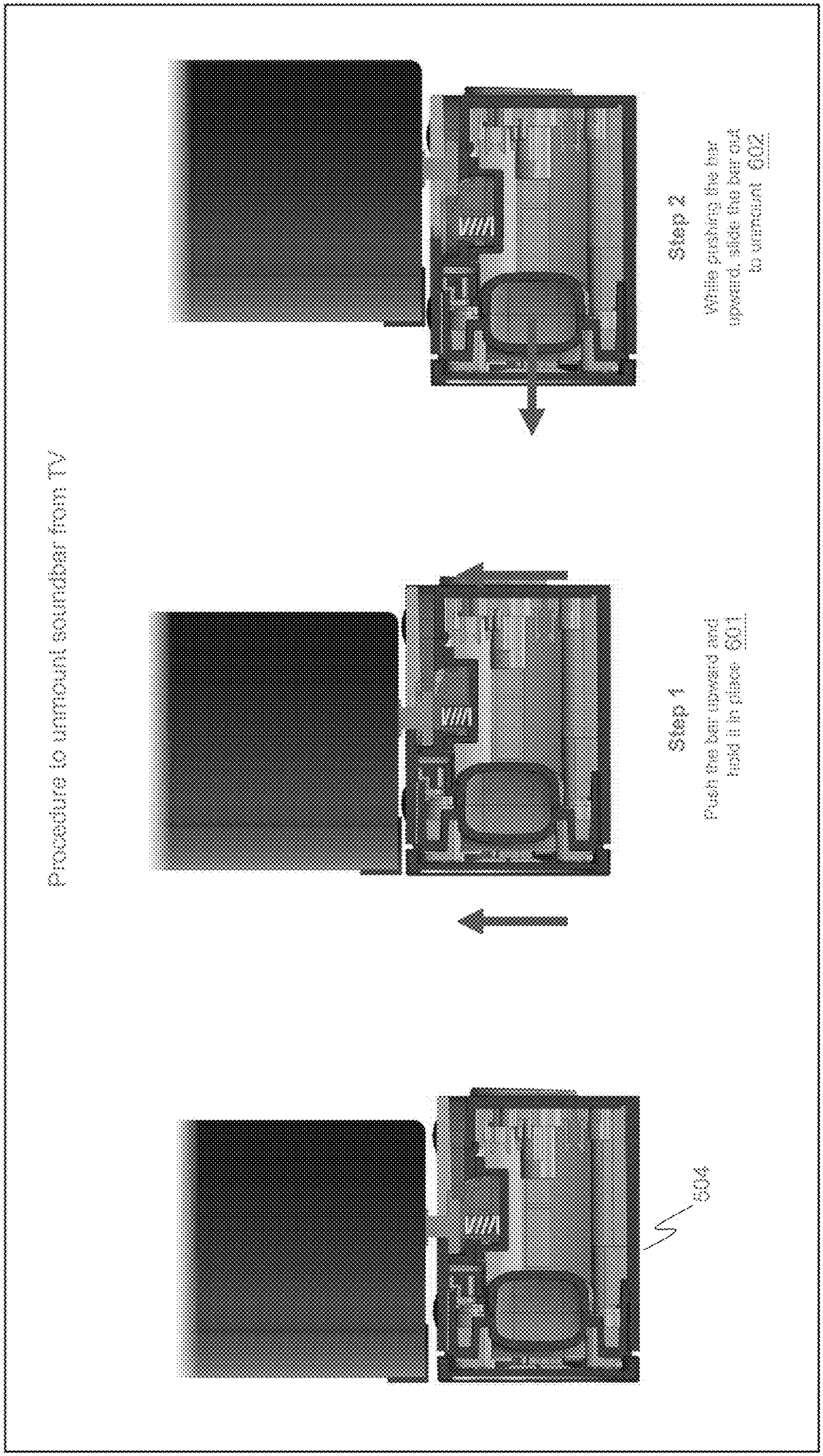
FIG. 6 illustrates reversing the process shown in FIG. 5 during a soundbar detachment operation.

Unmounting the soundbar 101 from TV 100 is diagrammed in FIG. 6. The user presses the soundbar 101 upward along the TV 100 height axis from below, thereby depressing the pressure tab 302 and its respective spring 404 along the TV 100 height axis. Depressing the pressure tab 302 as shown in FIG. 6 disengages the head of the thumbscrew 201 from the relieved region 403 of the roof-guide 401 so that the soundbar 101 may be slid forward of the TV 100 (i.e., slid away from the screen of the TV 100 in a direction along the TV 100 thickness axis. The user then simply pulls the soundbar 101 away from the TV 100 until the soundbar 101 is free of the thumbscrews 201.

Figure 7:
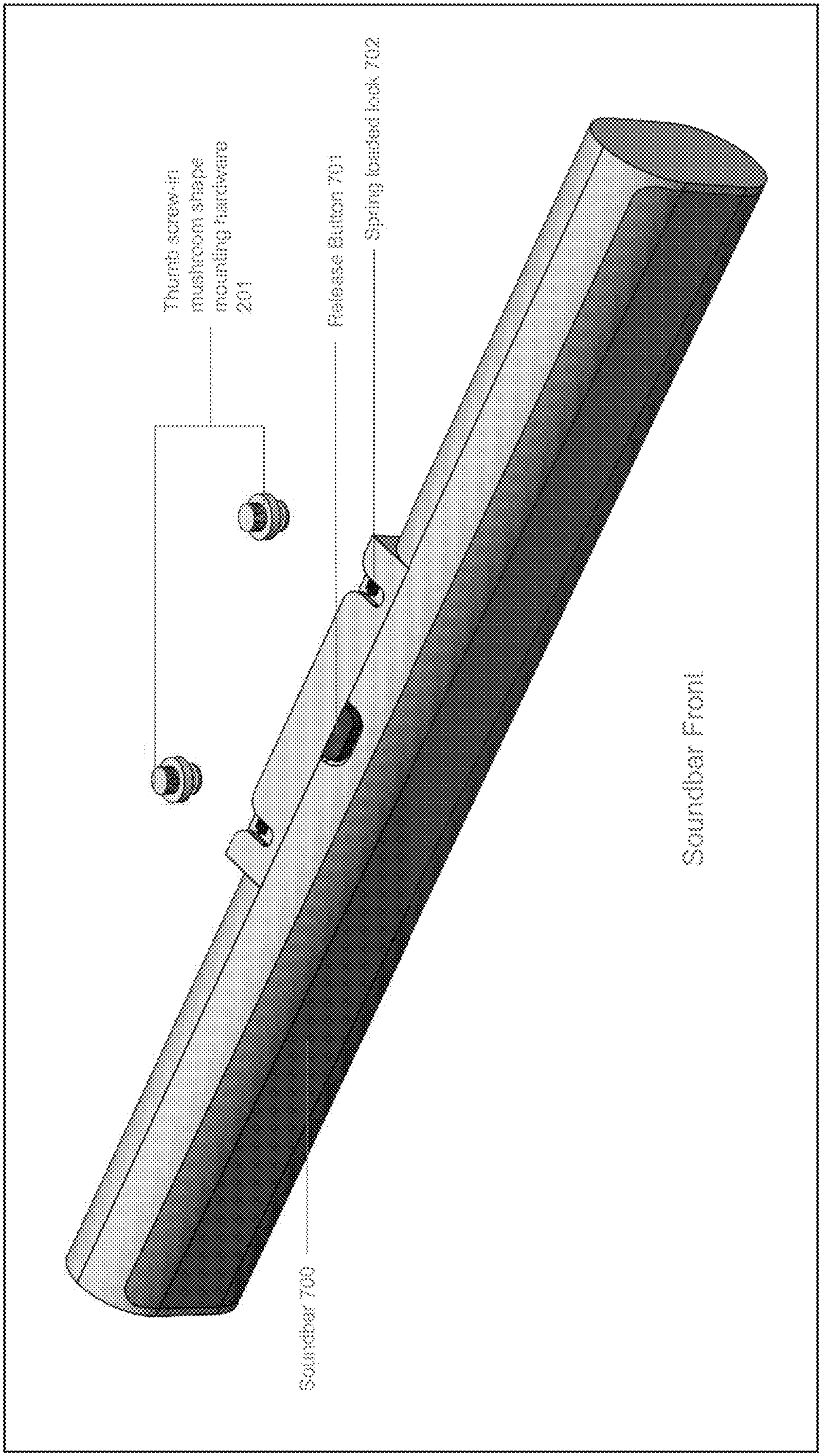
FIG. 7 illustrates a soundbar utilizing the second embodiment method including a spring-loaded lock and release button.
Figure 8:
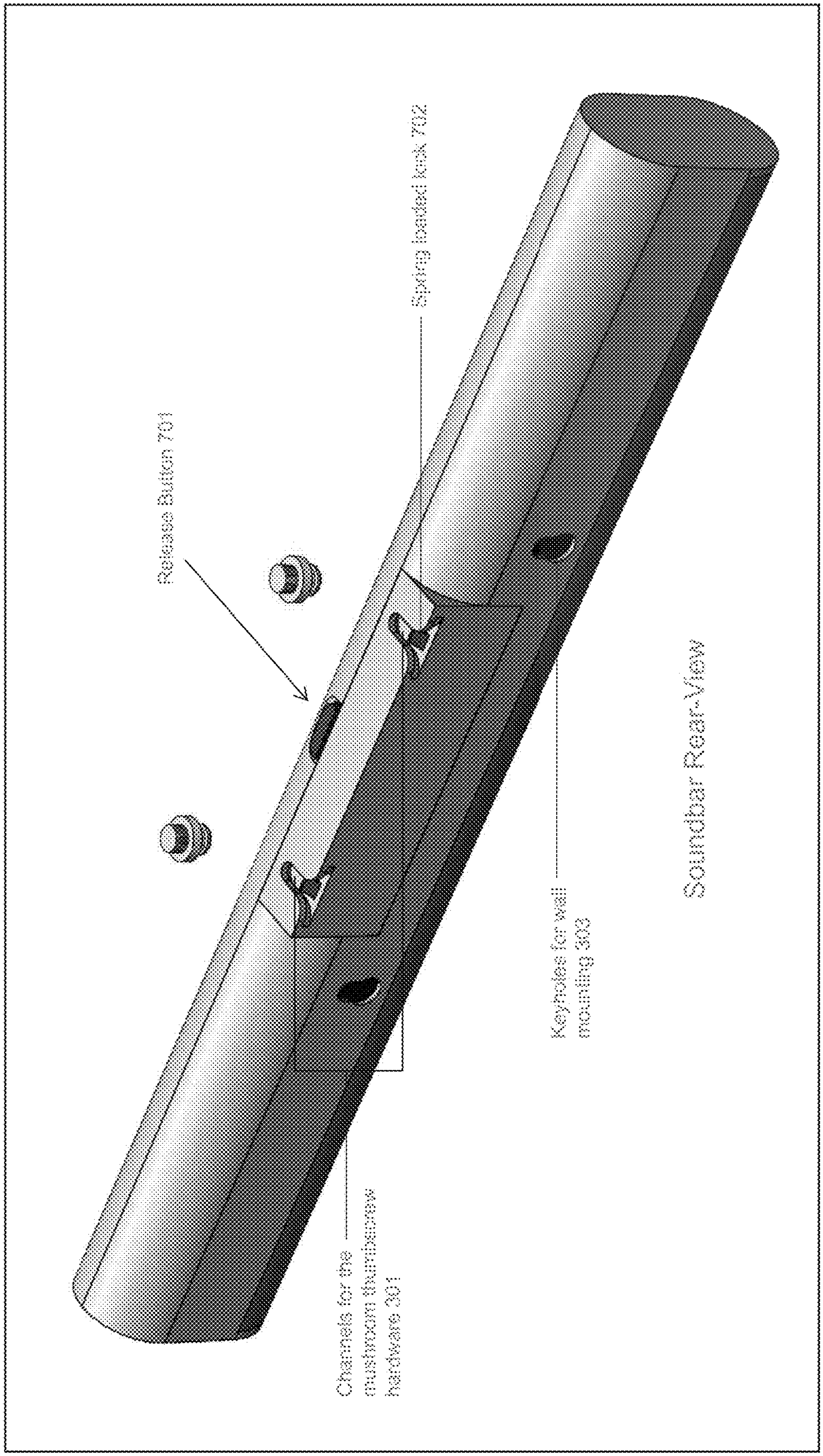
FIG. 8 illustrates the rear view of the soundbar of the second embodiment.
Figure 9:
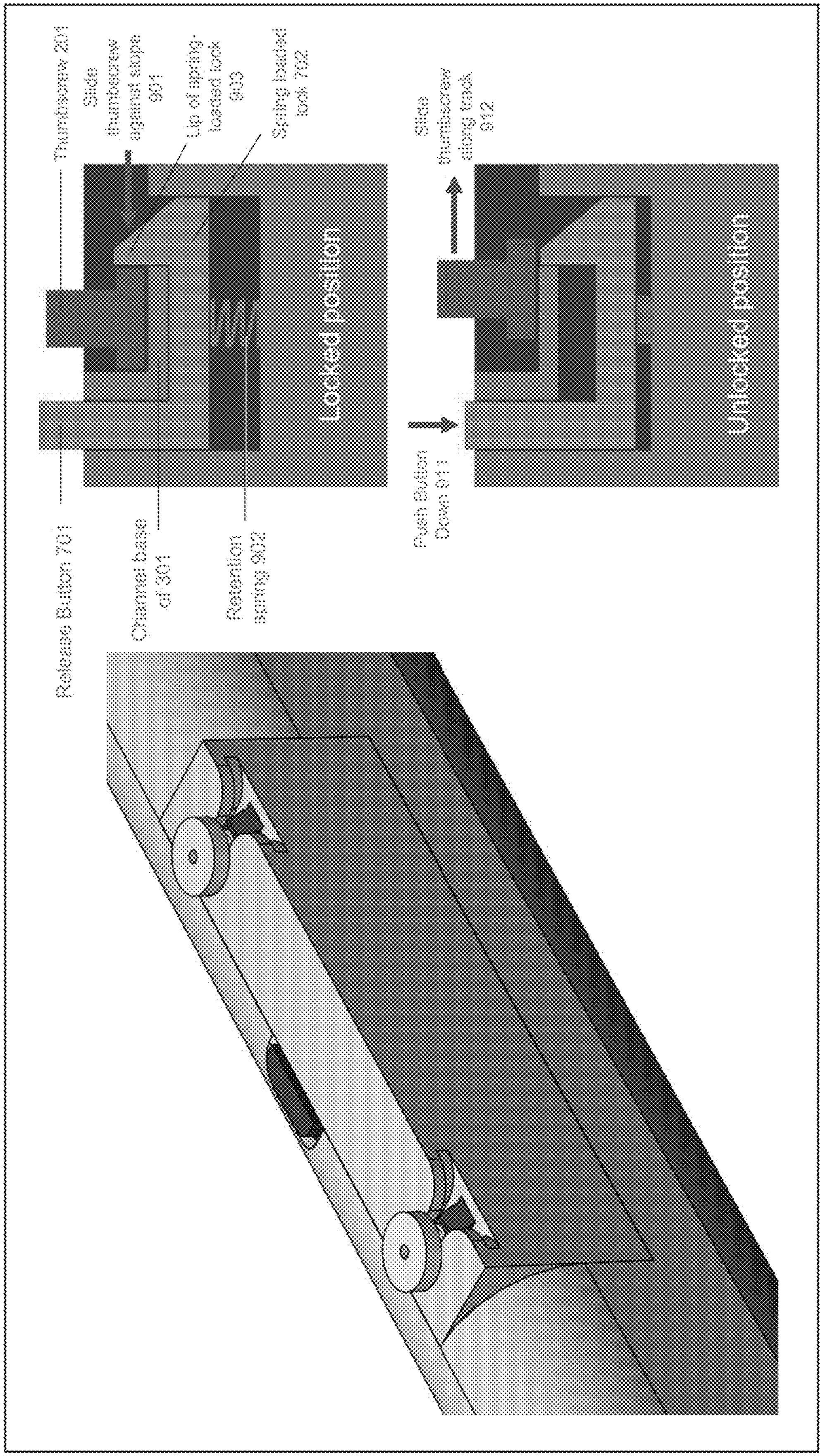
FIG. 9 shows a cross-sectional cut-away view of the disclosed spring-loaded mounting screw capture and locking system of the second embodiment.

In a second embodiment of the invention, some elements remain the same such as the mounting thumbscrews 201 and the mounting holes in the base of the TV 140. The difference is in the means by which the soundbar retention is achieved again without the need for tools. The essential locking mechanism is by means of a spring-loaded lock 702 as first seen in FIG. 7. The mounting scheme utilizes the guide channel 301 for mounting and unmounting of the soundbar 700 as illustrated in FIG. 8. As best seen in the cross-sectional cut-away views of FIG. 9, during mounting of the soundbar 700 to TV 100, the user slides each of the thumbscrews 201 along a corresponding channel 301 until the thumbscrews 201 press against a respective spring-loaded locking mechanism 702. As the user further pushes each thumbscrew 201 along a its respective guide channel 301, the sloped front 901 of each spring-loaded retention mechanism 702 is forced down against a respective spring 902, compressing spring 902 until it is flush with the channel base of 301. The thumbscrew 201 then continues to slide until it reaches the end of the channel 301 whereby the thumbscrew 201 head has passed the slope 901 which by the force of the spring 902 rises to the base of channel 301 and retains the thumbscrew thereby locking the soundbar 201 in place.

Figure 10:
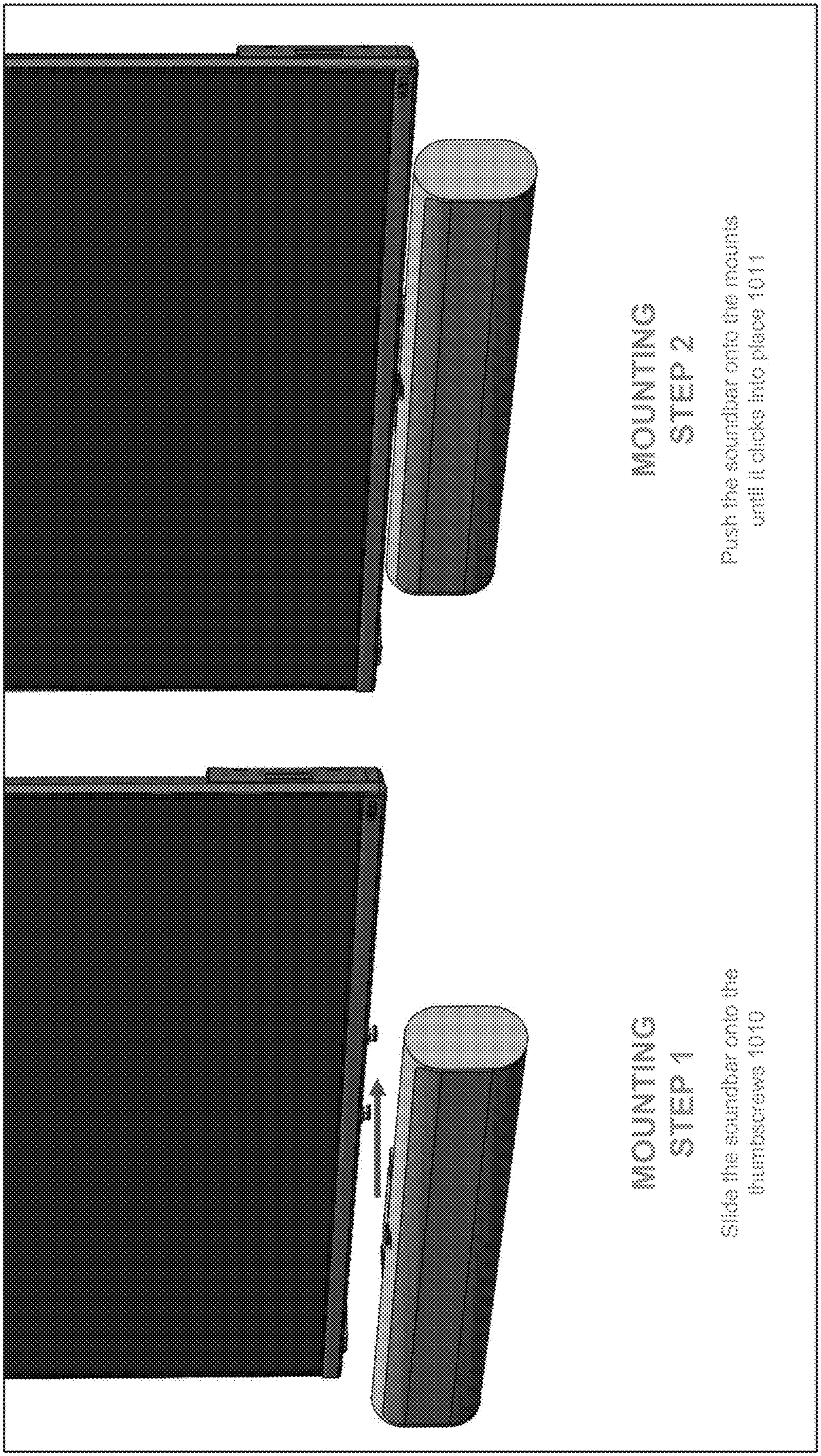
FIG. 10 shows the second embodiment steps of mounting the soundbar onto the TV.
Figure 11:
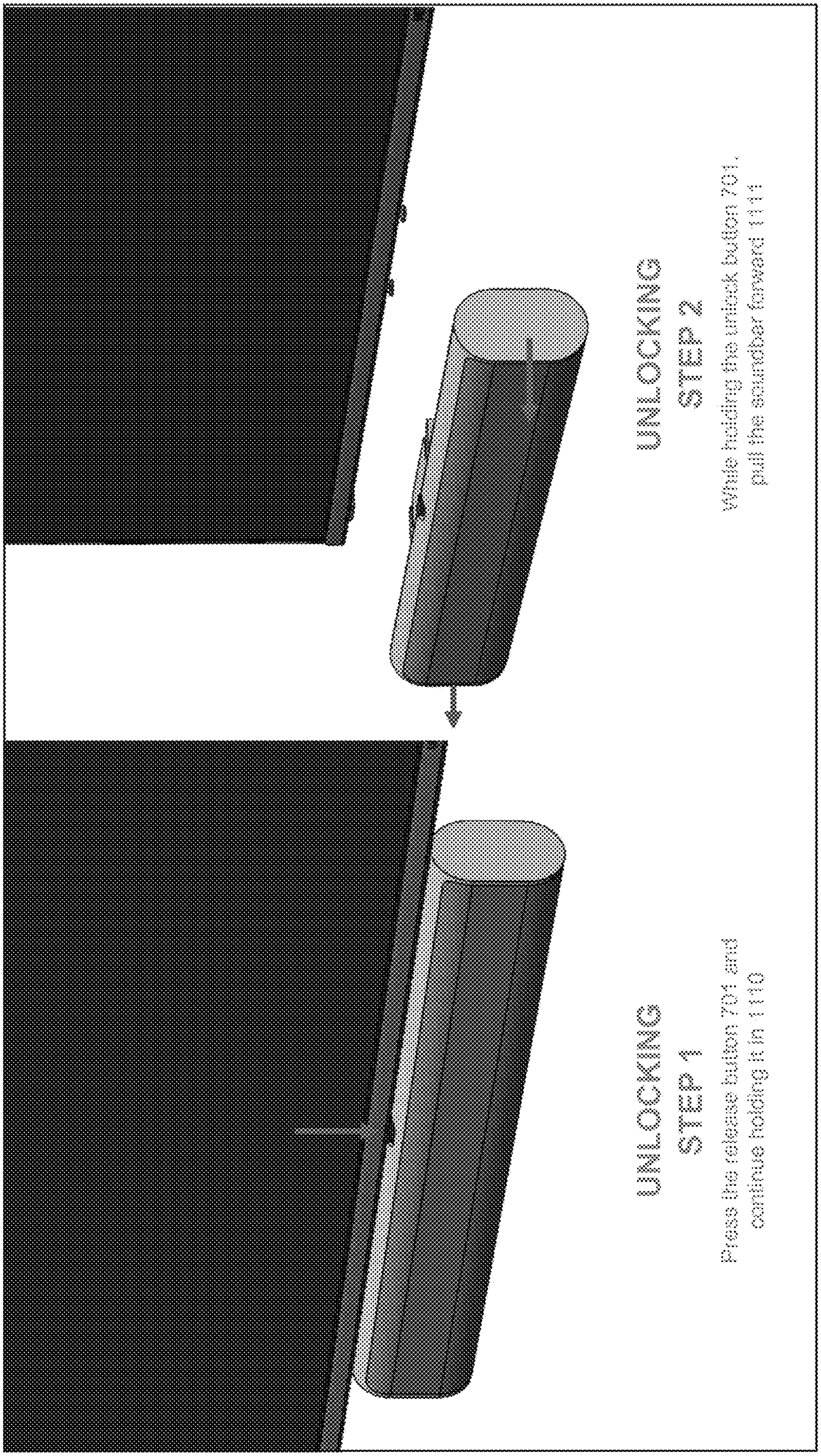
FIG. 11 shows the second embodiment steps of unmounting the soundbar from the TV.

The soundbar 700 is released from the mount by means of the user pressing and holding release button 701 while pulling the soundbar 700 toward the user and away from the front of the TV 100. The pressing of release button 701 forces the lip 903 of the spring-loaded lock 702 to be flush with the base of the guide channel 301 allowing the soundbar 201 to slide out of channel 301. FIG. 10 shows the soundbar 700 in perspective of the TV 100 where the user simply pushes the soundbar 700 onto the thumbscrews 201 until it clicks into the locking position. FIG. 11 shows soundbar 700 in perspective of TV 100 being removed by the user pressing and holding the release button 701 while pulling the soundbar 101 away from the TV until it is free of the thumbscrews 201.

Figure 12:
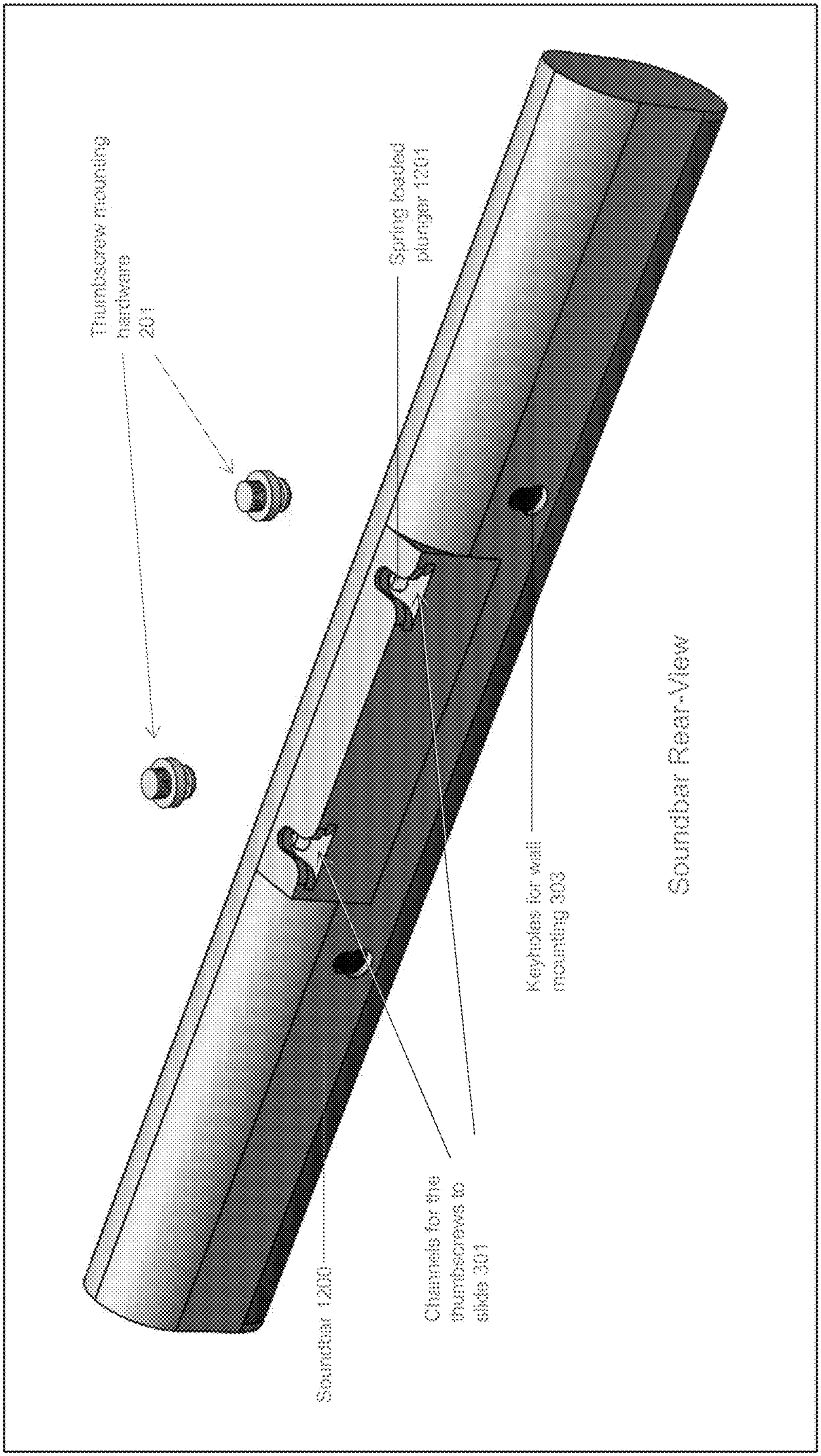
FIG. 12 illustrates the rear view of the soundbar of the third embodiment.
Figure 13:
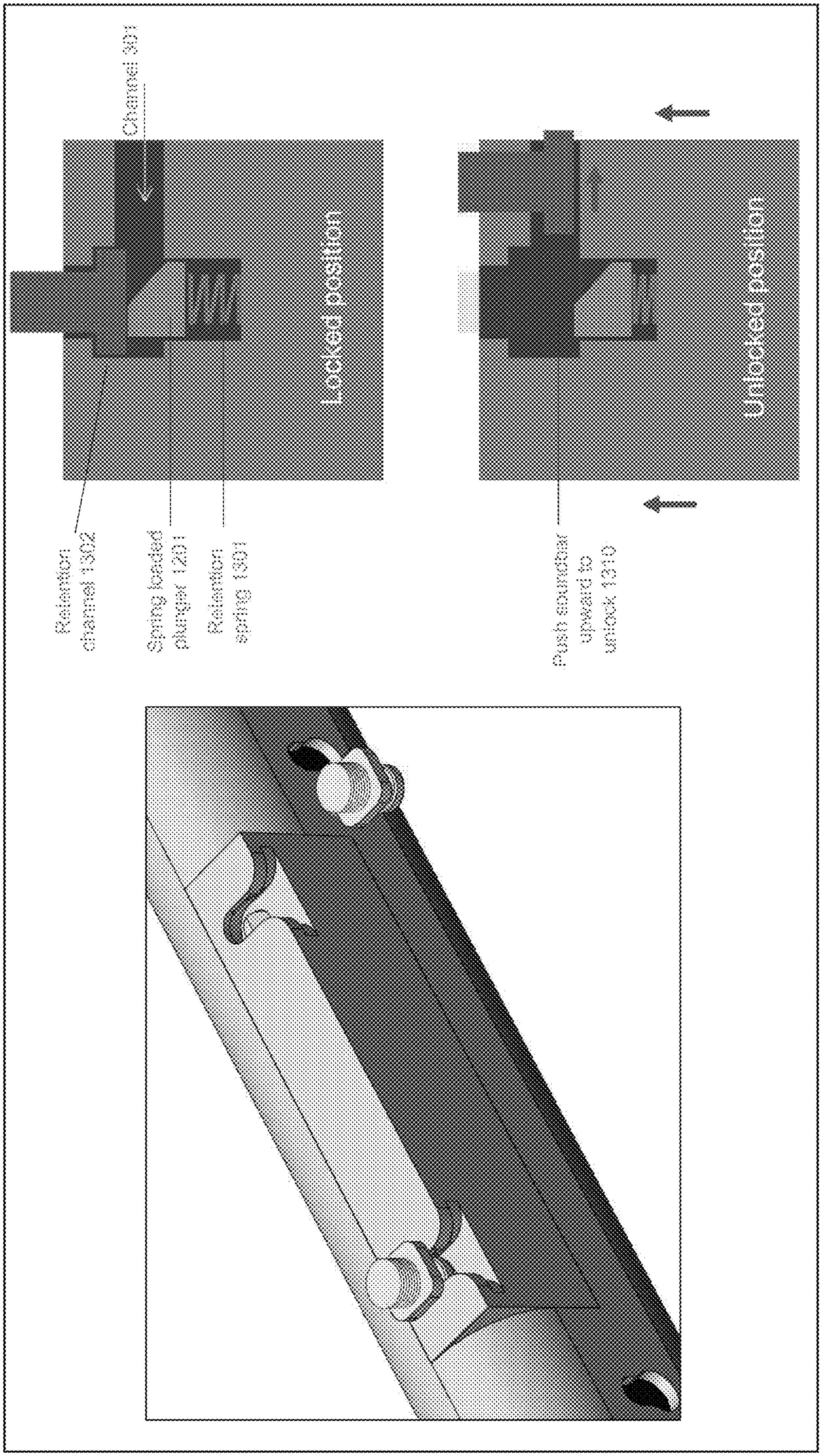
FIG. 13 shows a cross-sectional cut-away view of the disclosed spring-loaded mounting screw capture and locking system of the third embodiment.
Figure 14:
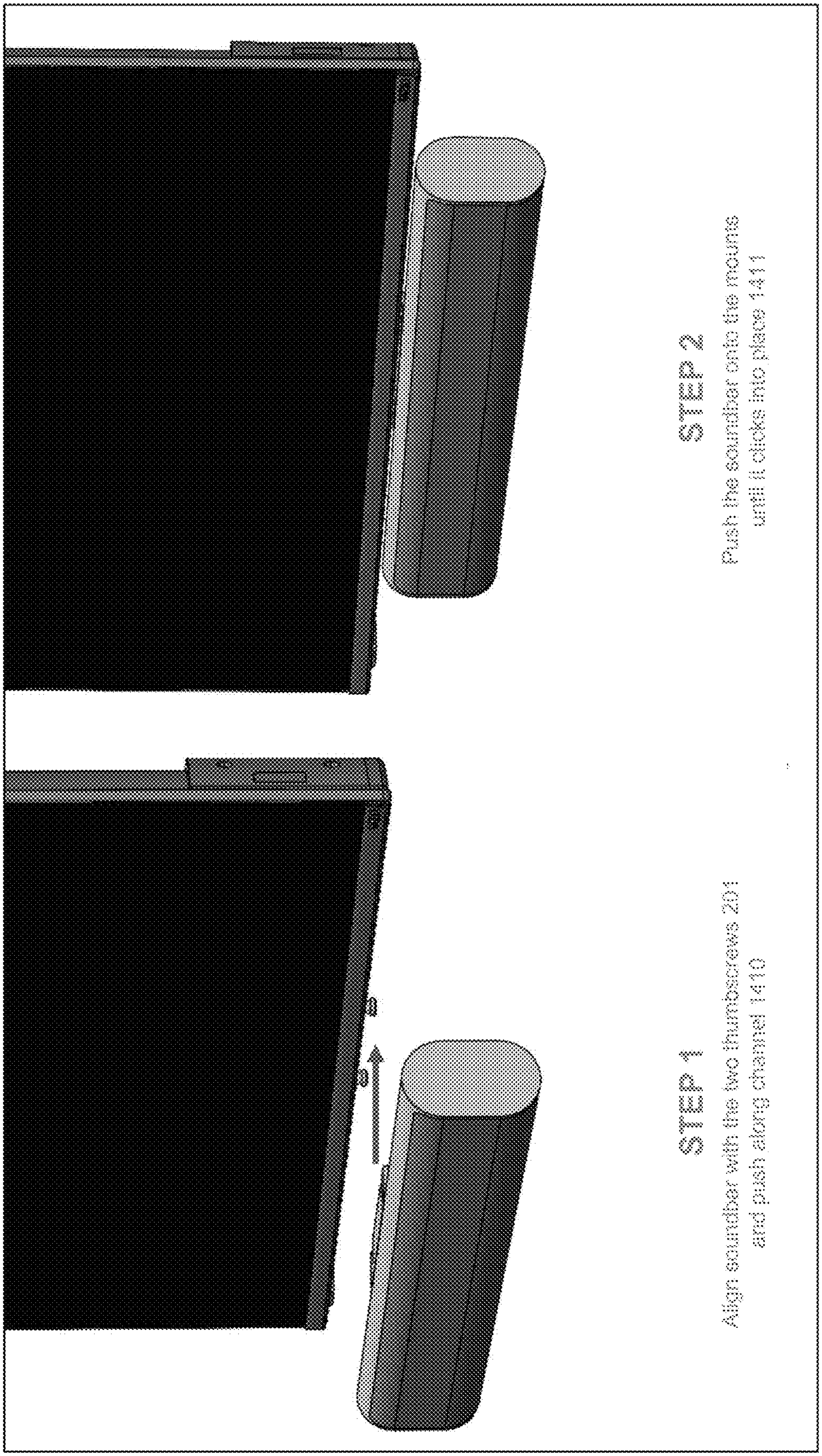
FIG. 14 shows the third embodiment steps of mounting the soundbar onto the TV.
Figure 15:
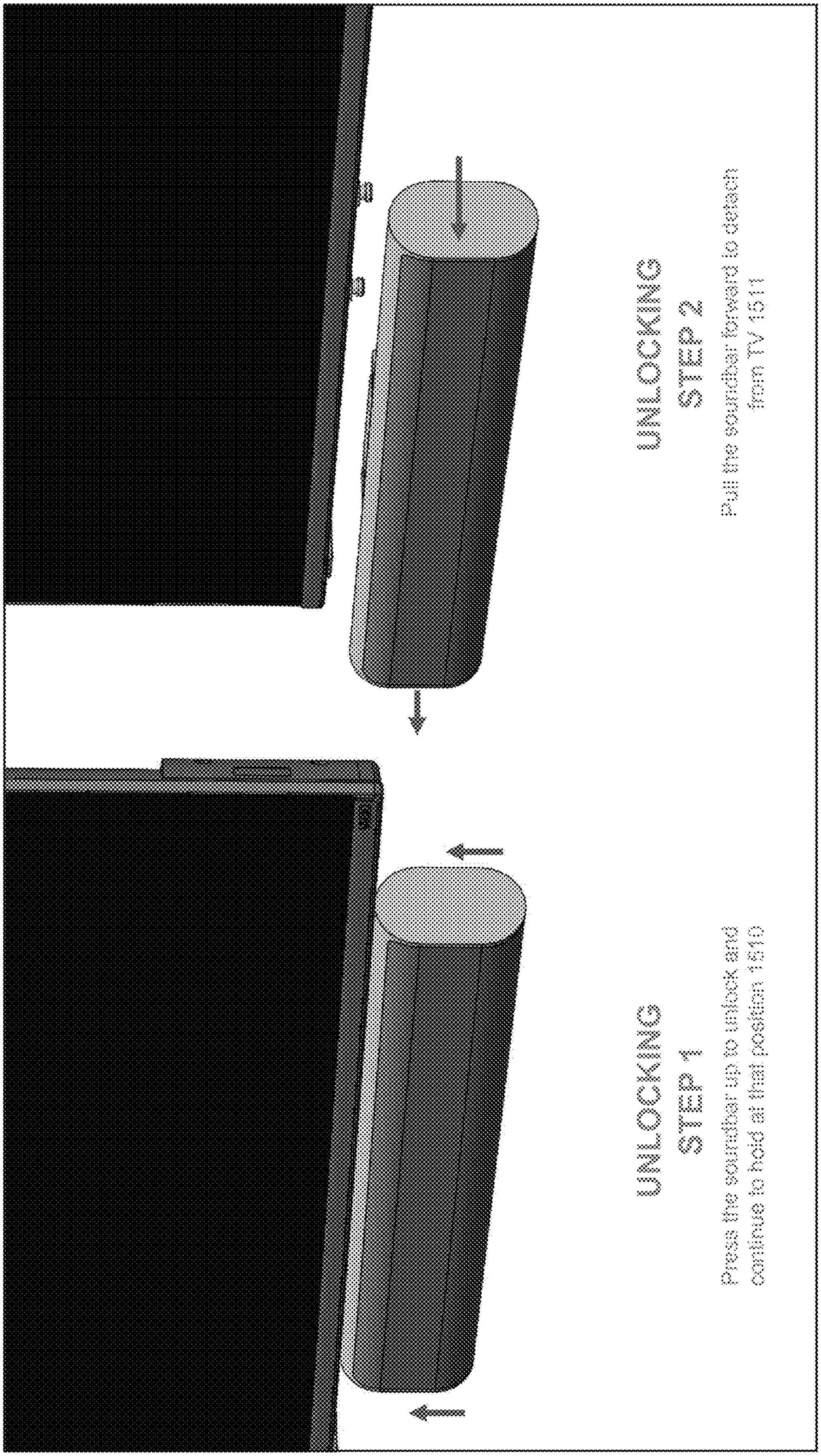
FIG. 15 shows the third embodiment steps of unmounting the soundbar from the TV.

In a third embodiment of the invention, the soundbar 1200 is fitted with a spring-loaded plunger mechanism 1201 as illustrated in FIG. 12. Each thumbscrew 201 is slid along channel 301 until it encounters a corresponding spring-loaded plunger mechanism 1201 whereby further pressure from the user forces the plunger 1201 compress spring 1301 until the thumbscrew 201 reaches the end of channel 301 whereby it is forced up into retention channel 1302 as illustrated in FIG. 13. To unmount the soundbar 1200, the user pushes up on the soundbar 1200 until the thumbscrew 201 reaches the bottom of channel 301. The user then pulls the soundbar 101 away from the front of the TV 100 until it is free of the thumbscrews 201. FIG. 14 illustrates the soundbar 1200 mounting to TV 100 and FIG. 15 shows the steps to unmount the soundbar 1200 from TV 100.

Figure 16:
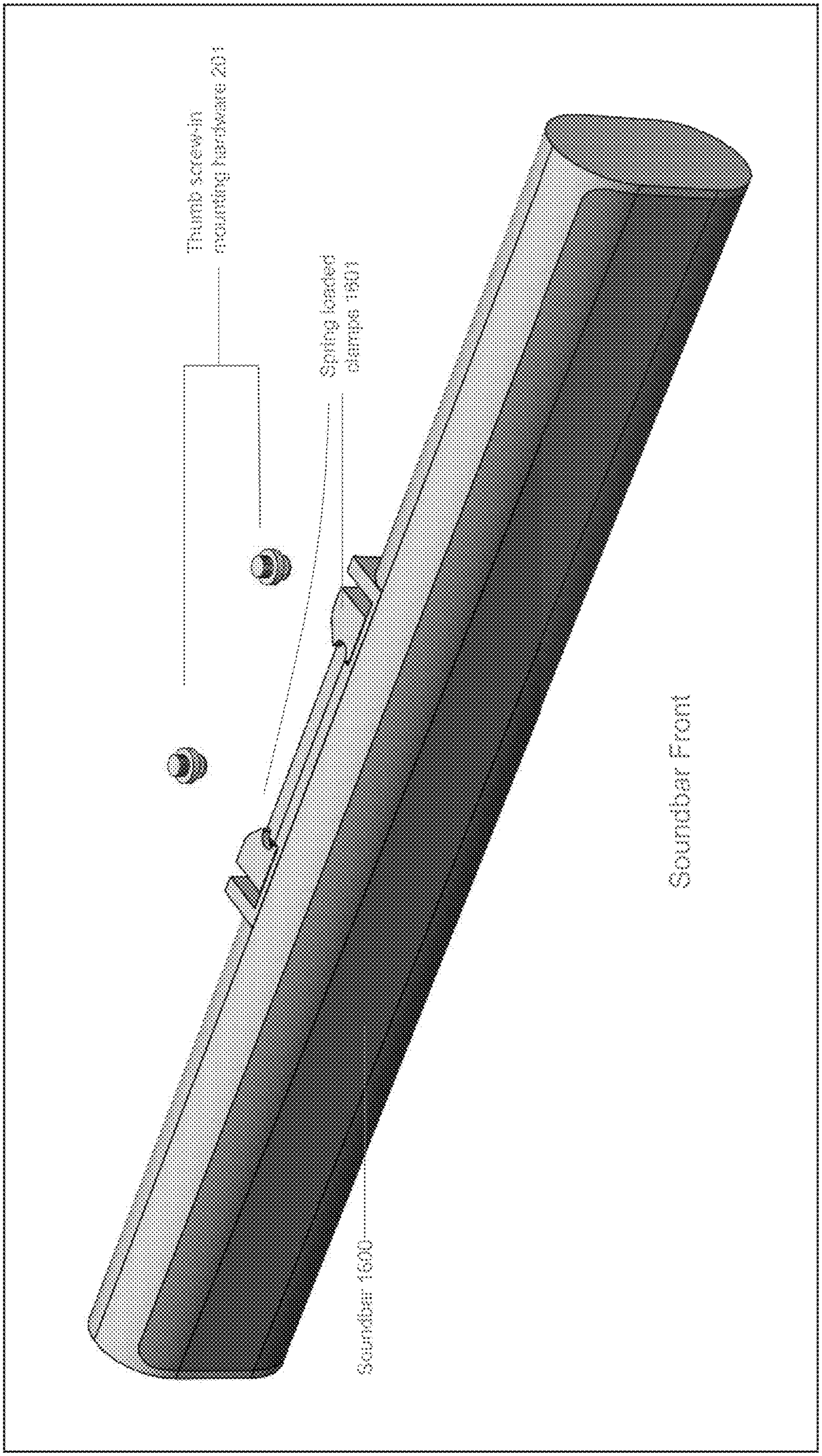
FIG. 16 illustrates a soundbar utilizing the fourth embodiment method including a lateral spring-loaded clamp.
Figure 17:
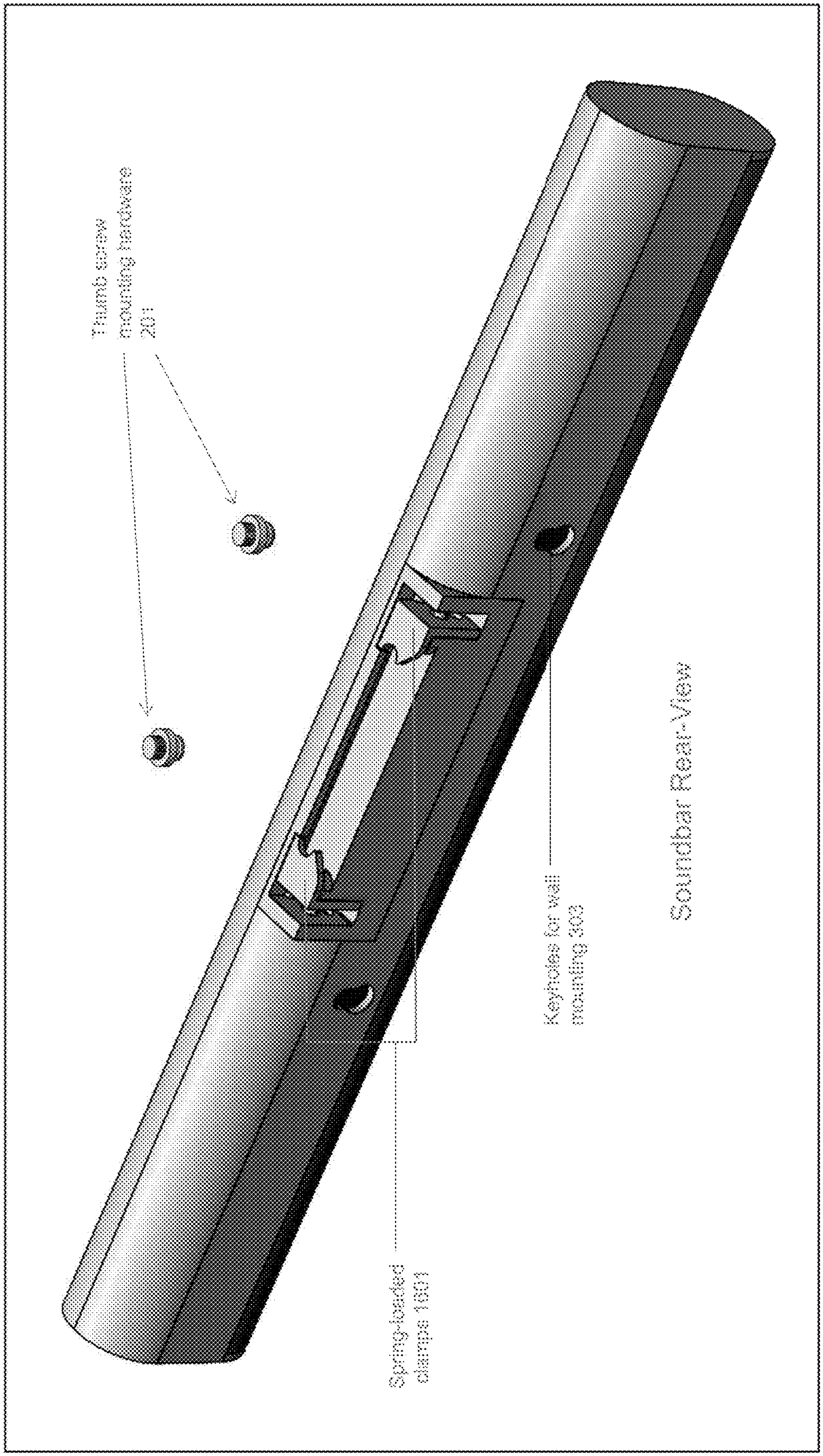
FIG. 17 illustrates the rear view of the soundbar of the fourth embodiment.
Figure 18:
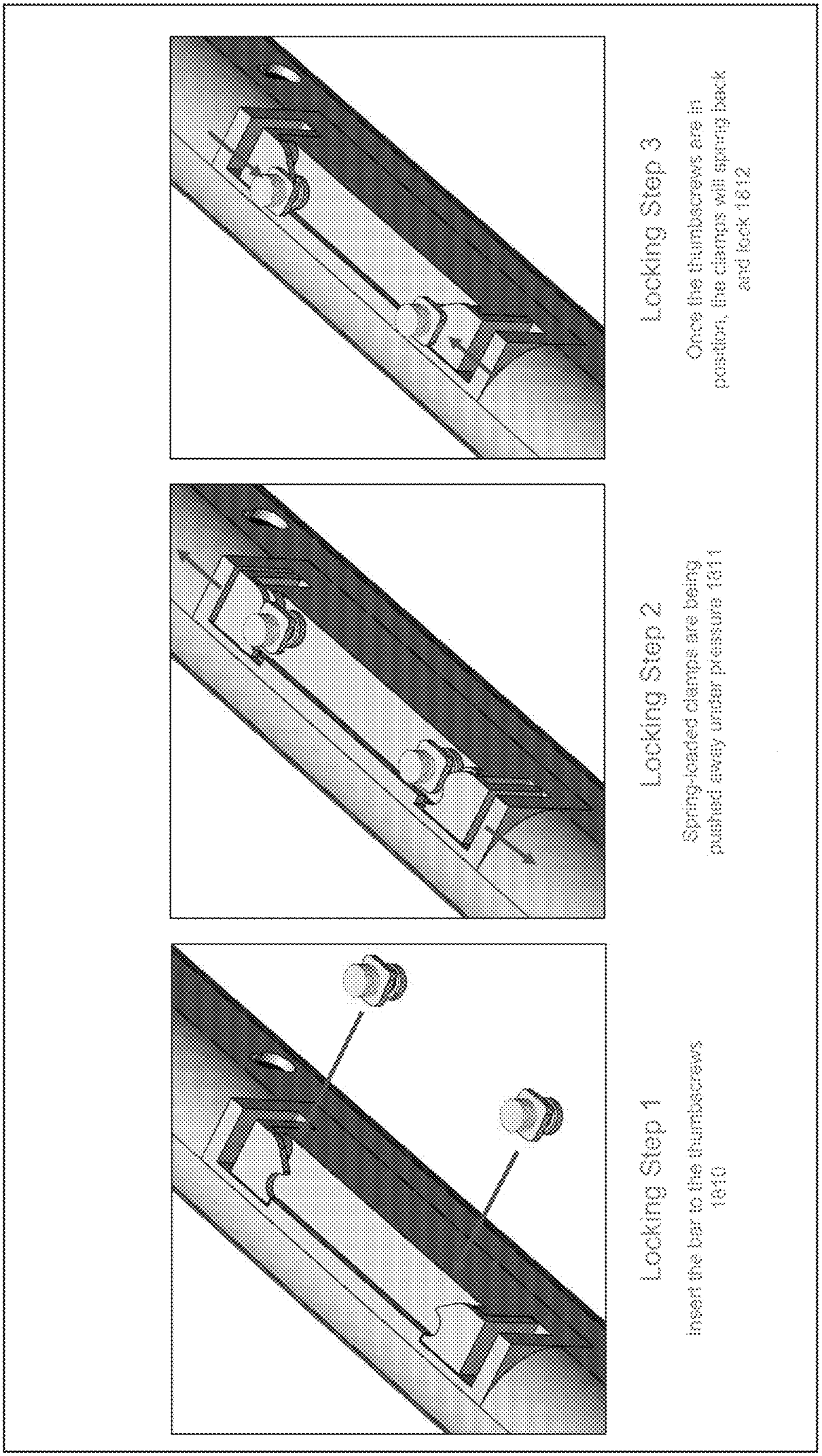
FIG. 18 shows the fourth embodiment steps of mounting the soundbar onto the TV.
Figure 19:
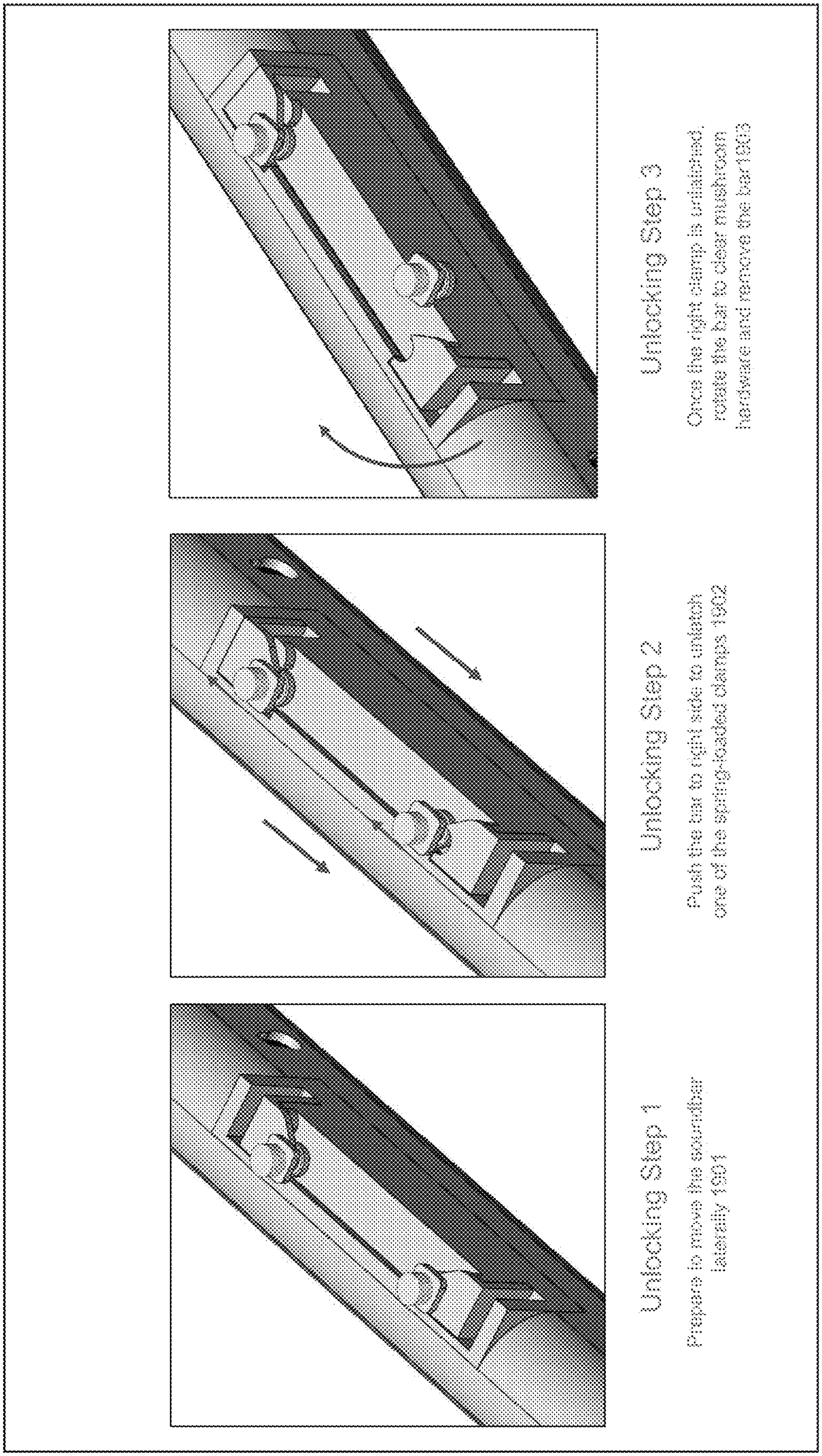
FIG. 19 shows the fourth embodiment steps of unlocking the soundbar from the TV.
Figure 20:
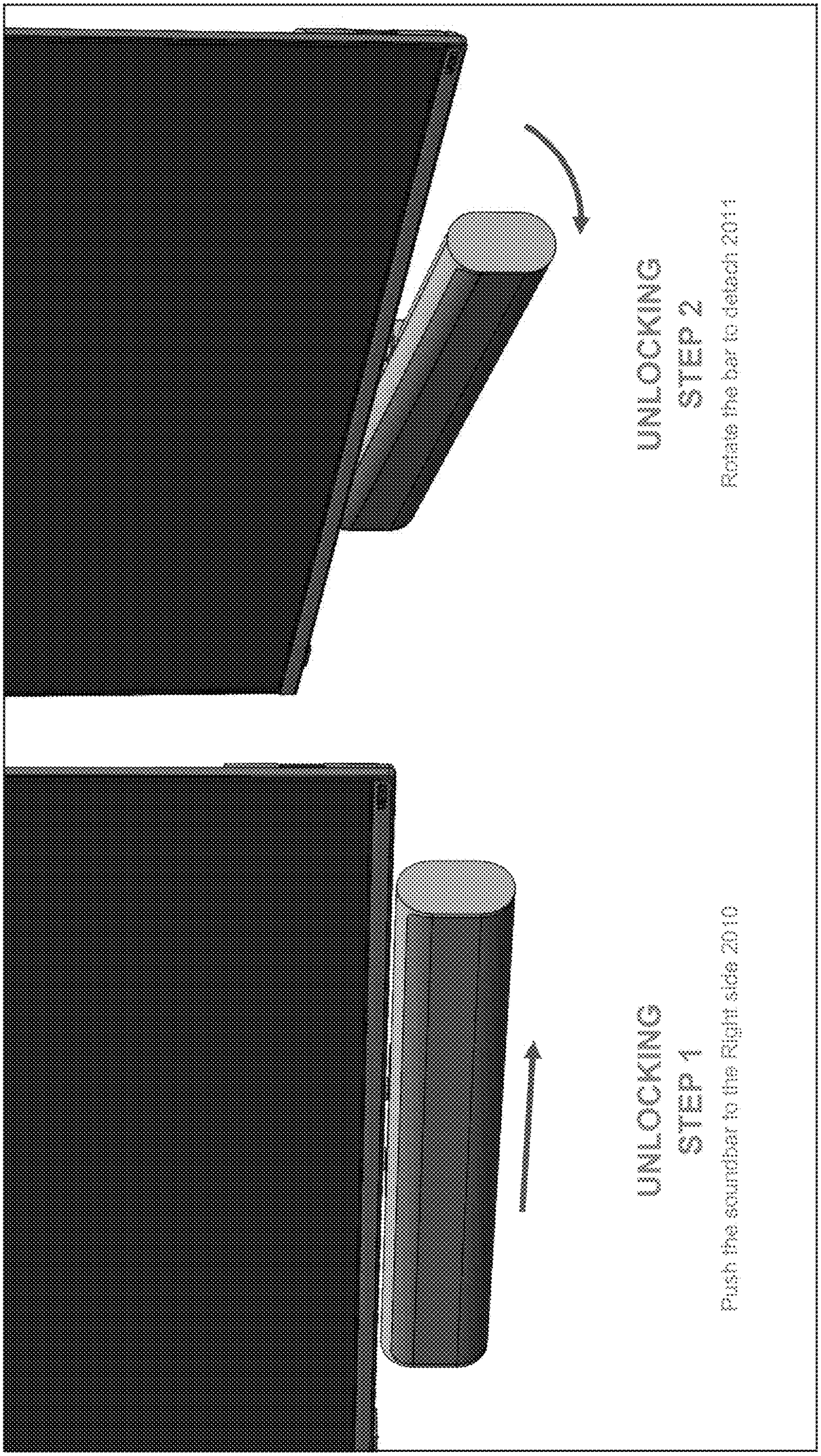
FIG. 20 illustrates a TV with the fourth embodiment soundbar being unmounted from the TV.

A fourth embodiment is illustrated in FIG. 16 where a lateral, spring-loaded clamping mechanism 1601 is provided to retain the soundbar 1600. FIG. 17 shows a rear-view of soundbar 1600 with the spring-loaded clamps 1601 and the relative clearance of the clamps 1601. In FIG. 18, the mounting steps are shown with the soundbar 1600 pressed against the thumbscrews 201 and as the user applies pressure, the spring-loaded clamps push away in opposite directions until the thumbscrews clear the lip of the lateral clamps and the clamps return to press against the thumbscrews thereby retaining the soundbar 1600. The steps to unmount soundbar 1600 are illustrated in FIG. 19. The user moves the soundbar 1600 to the left or right in parallel with the base of the TV 100 forcing the respective clamp to be compressed against its spring mount. The distance the soundbar 1600 will move in the direction in which the user is forcing it is enough to free the opposite side thumbscrew and allow the user to swing the free side away from the TV 100. The user then releases pressure and moves the remaining side of the soundbar 1600 away from the TV 100. These steps are illustrated in the perspective of the TV 100 in FIG. 20.

Figure 21:
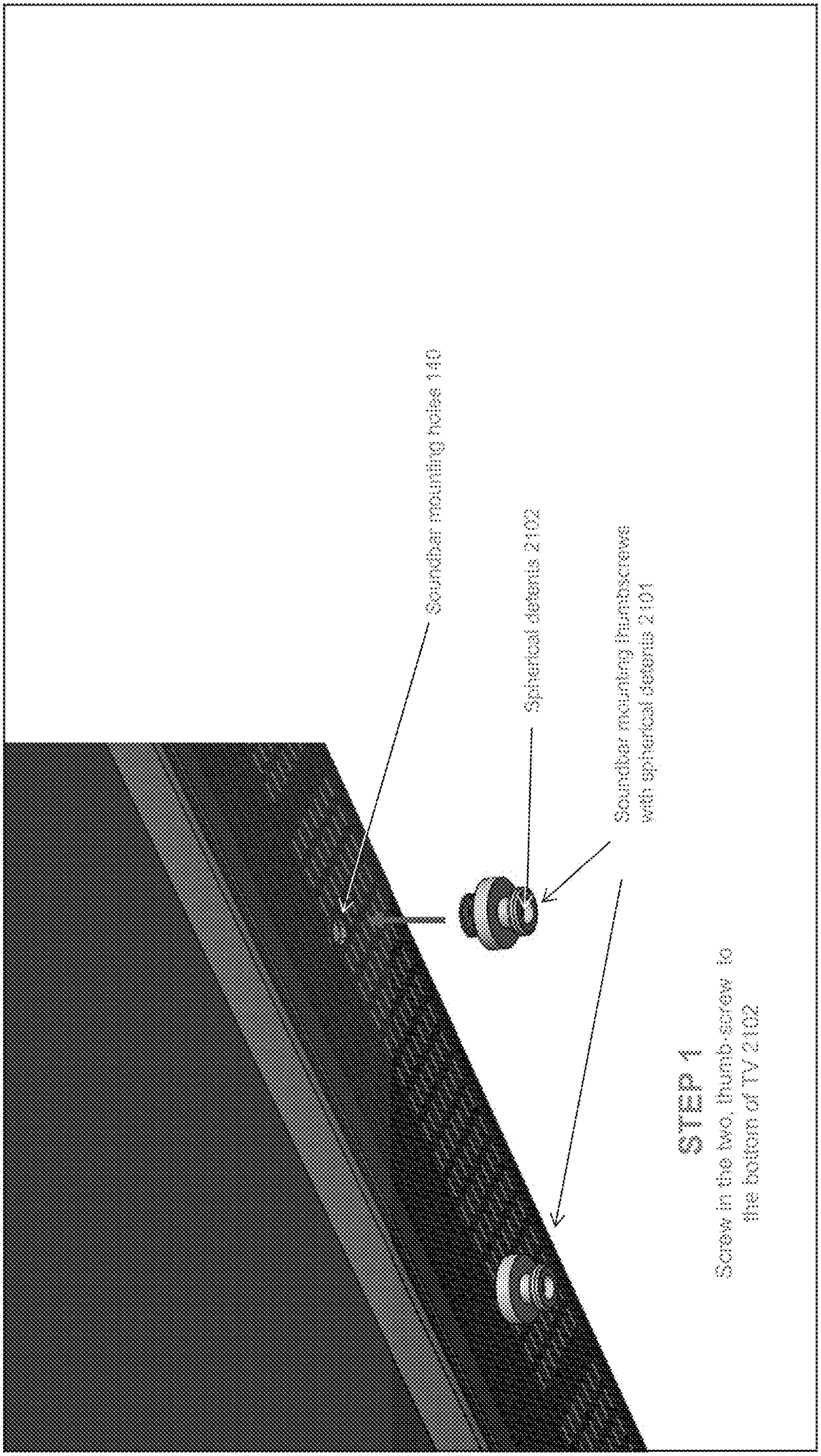
FIG. 21 shows the bottom perspective view of the flat screen TV showing the two-thumbscrew mounting locations on the bottom surface of the TV in the fifth embodiment of the soundbar mounting system utilizing thumbscrews with a spherical detent on the top of the thumb screw.
Figure 22:
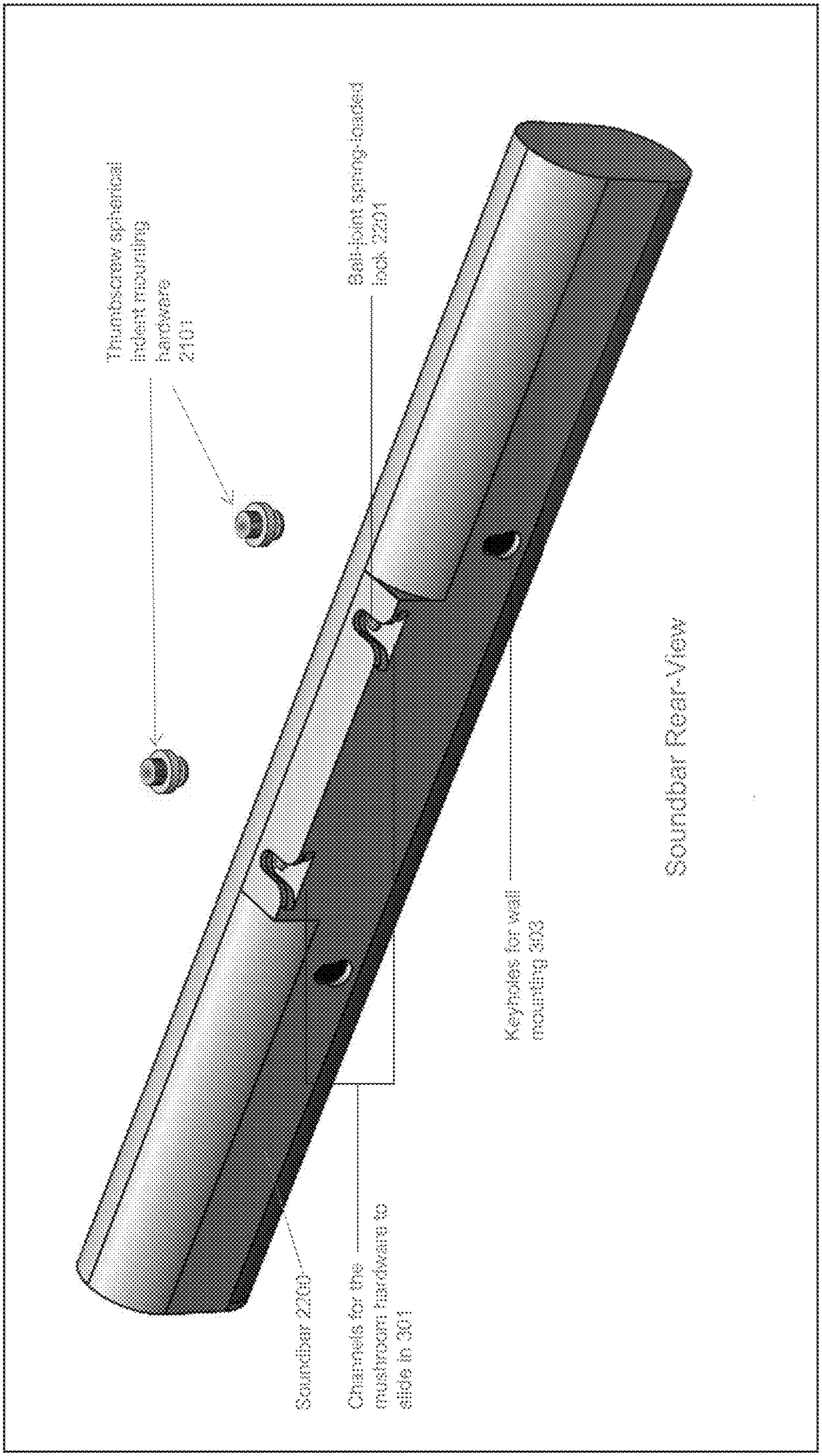
FIG. 22 illustrates the rear view of the soundbar of the fifth embodiment.
Figure 23:
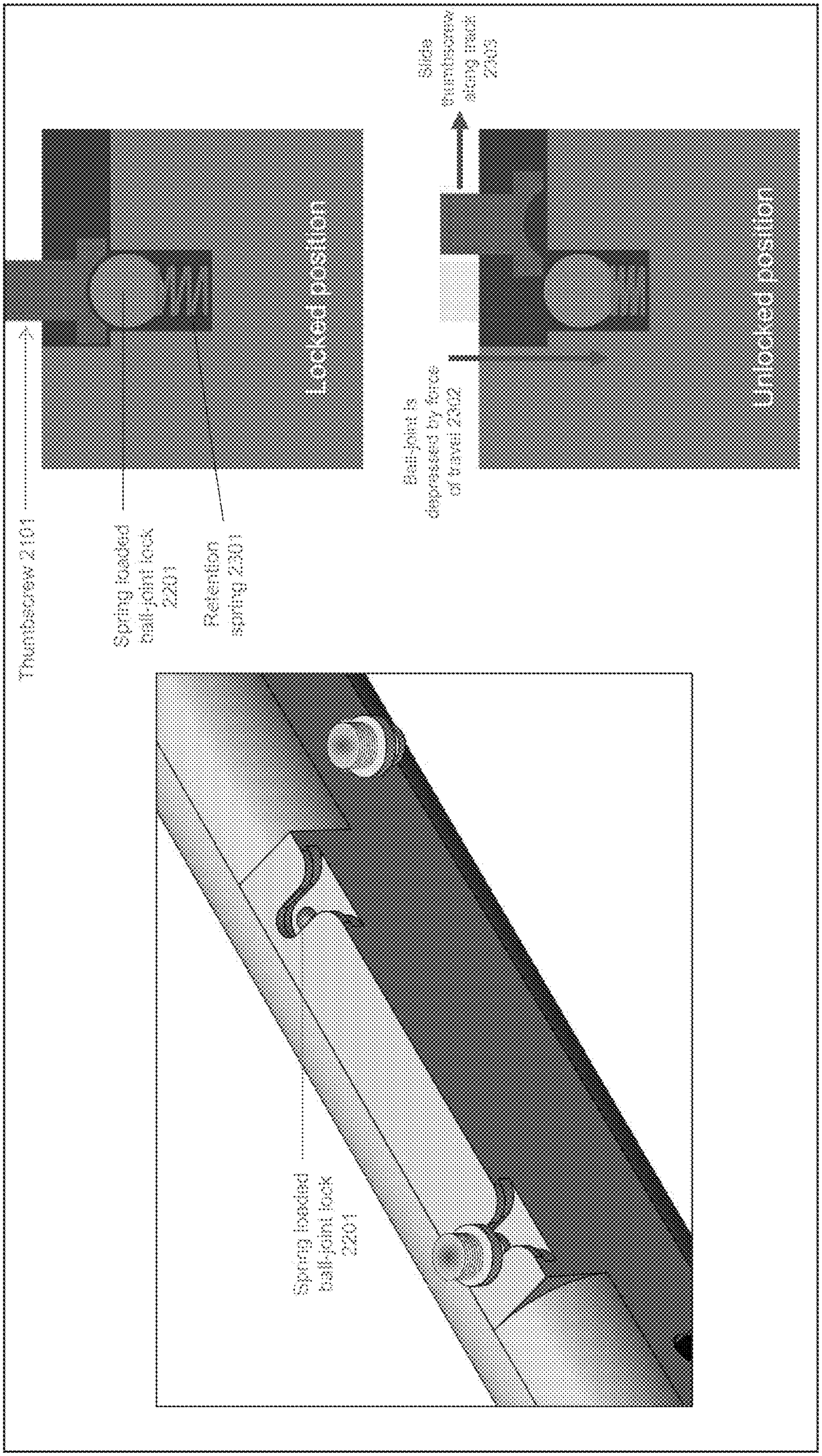
FIG. 23 shows a cross-sectional cut-away view of the disclosed spring-loaded mounting screw capture and locking system of the fifth embodiment.
Figure 24:
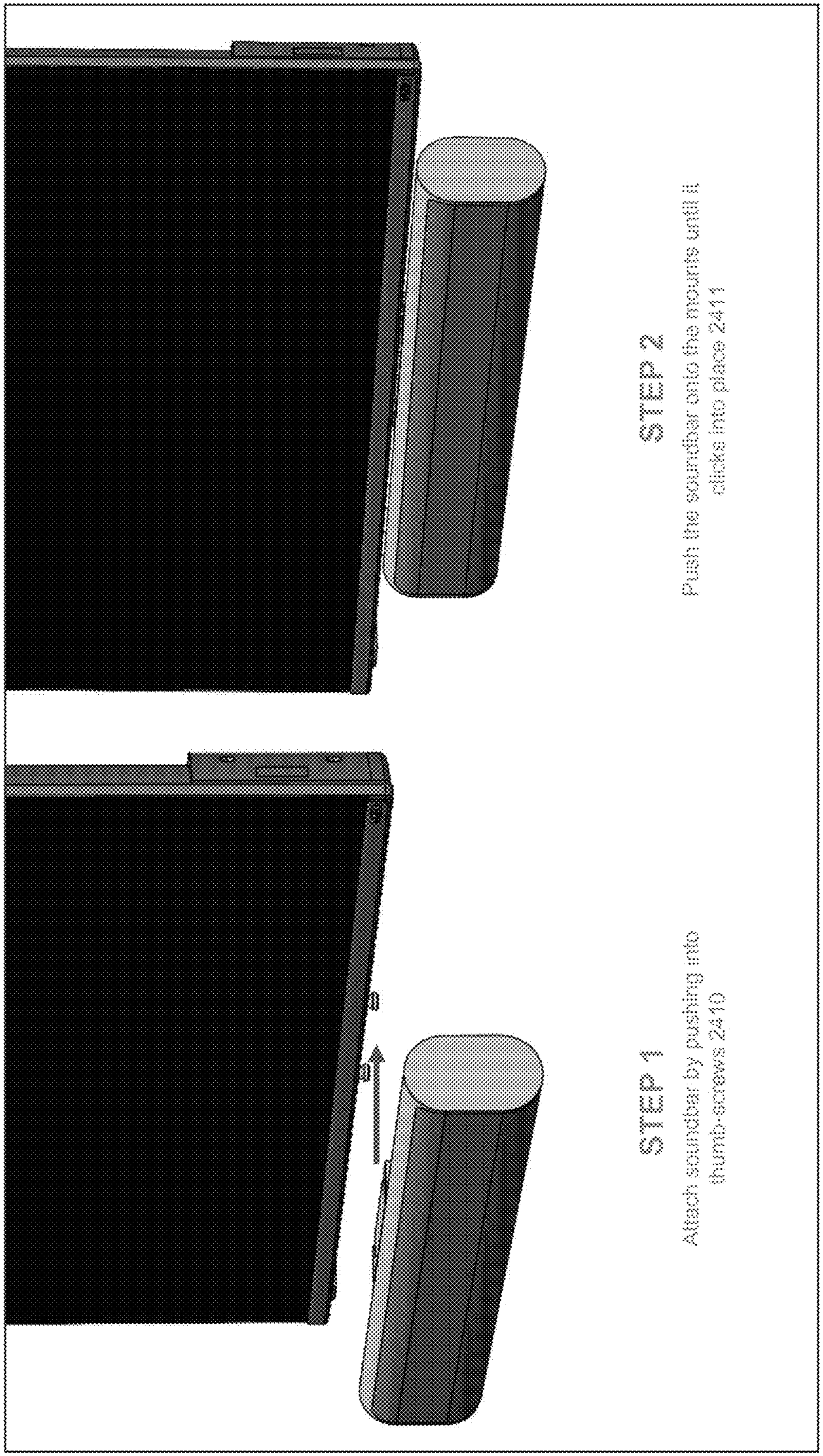
FIG. 24 shows the fifth embodiment steps of mounting the soundbar onto the TV.
Figure 25:
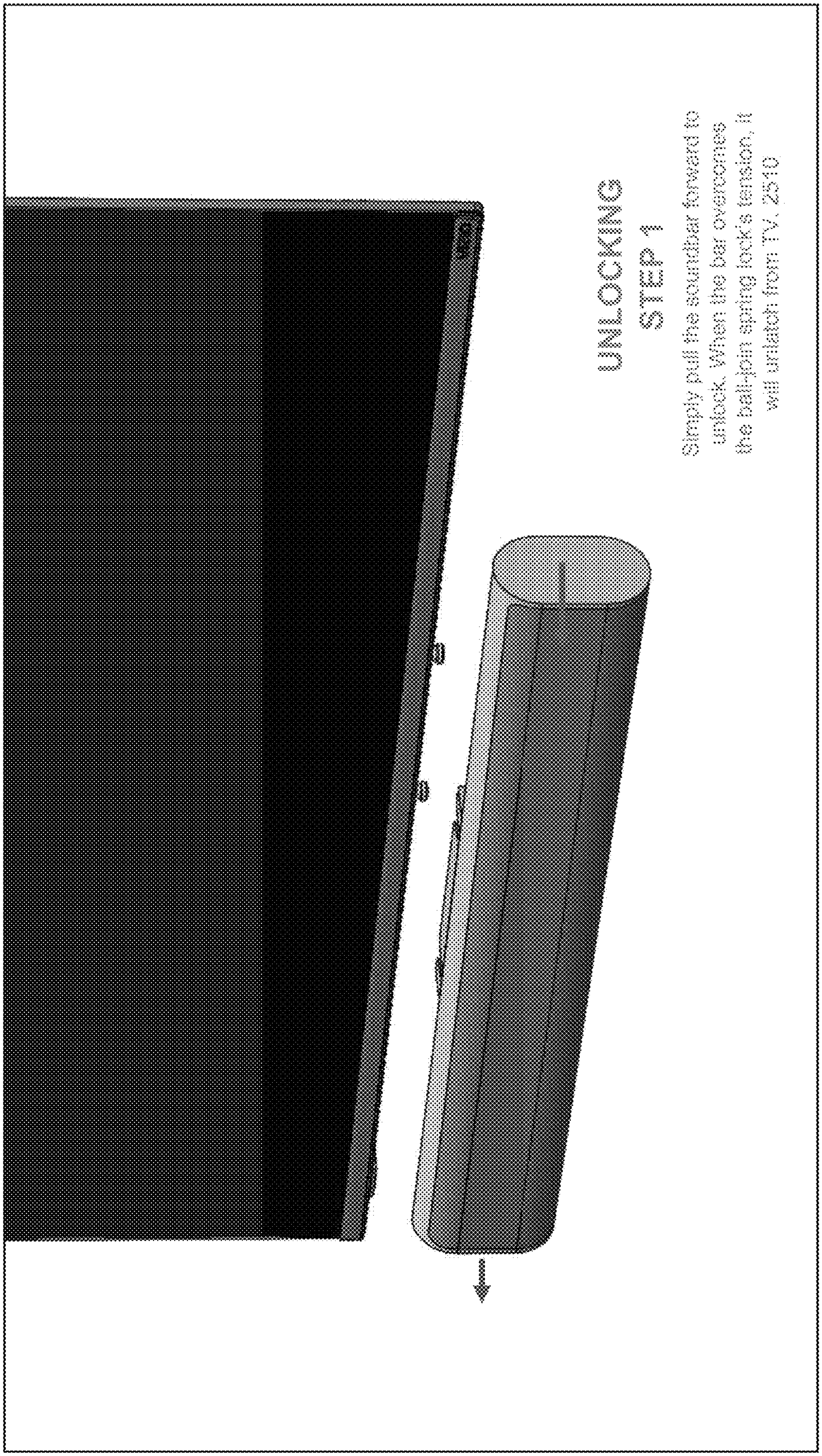
FIG. 25 shows the fifth embodiment step of unlocking the soundbar from the TV.

In a fifth embodiment of the invention, a different type of thumbscrew is used that has a spherical indentation 2101 as seen in FIG. 21. Soundbar 2200 utilizing a ball-joint spring-loaded lock 2201 is illustrated in FIG. 22. Soundbar 2200 is mounted by aligning the soundbar 2200 channels 301 with the thumbscrews 2101 and sliding the soundbar 2200 along the channel 301 until it encounters the thumbscrews 2101. FIG. 23 shows a cross-sectional view of the mounting mechanism. The user then applies additional pressure to force the spring-loaded ball-joint lock 2201 into the retention spring 2301 while the thumbscrew 2101 slides over the ball-joint lock until the thumbscrews reach the end of channel 301 whereby the ball-joint lock will the be seated into the concave sphere head 2102 of the thumbscrew 2101. Releasing the soundbar 2200 requires the users to only pull the soundbar 2200 toward the user and away from the TV 100. FIG. 24 illustrates the mounting procedure with respect to the TV 100. FIG. 25 shows the unmounting of the soundbar 2200.

As disclosed, these are some examples of useful embodiments of the invention. The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. An audio-visual system, comprising:

a video display having a top surface and a bottom surface spaced apart along a height axis, a screen and a back panel spaced apart along a thickness axis, and a width axis;

a plurality of fasteners attached to the bottom surface of the video display and spaced apart along the width axis;

a soundbar having a top panel and a bottom panel spaced apart along a soundbar height axis, plurality of elongated channels spaced apart from one another along a soundbar length axis, and a plurality of biasing elements, wherein when the soundbar is in an uninstalled condition, each of the biasing elements is biased into engagement with a respective retaining surface defined by the top panel of the soundbar, and when the soundbar is in an installed condition, a portion of each of the fasteners is located between a respective one of the biasing elements and a respective one of the retaining surfaces and biased into engagement with the respective one of the retaining surfaces.

2. The audio-visual system of claim 1, wherein the biasing elements in the plurality of biasing elements are spring-biased caps.

3. The audio-visual system of claim 1, wherein each of the elongated channels in the plurality of channels extends along a thickness axis of the soundbar, and each retaining surface is defined in a lower surface of the top panel adjacent an end of a respective one of the one of the channels in the plurality of channels.

4. The audio-visual system of claim 1, wherein the top panel of the soundbar includes a plurality of cut-away portions, each cut-away portion being located proximate a respective one of the channels for restraining the movement of the soundbar along the video display thickness axis when the soundbar is installed on the video display.

5. An audio-visual system comprising:

a video display having a top surface and a bottom surface spaced apart along a height axis;

a plurality of fasteners attached to the bottom surface of the video display and spaced apart along the width axis; and a soundbar configured to snap-fittingly engage the video display and further defining a top panel having at least two channels spaced apart along a length axis of the soundbar, and at least two biasing elements, each of the biasing elements being located in a respective one of the channels, wherein each of the at least two biasing elements is spring-biased toward the top panel of the soundbar;

wherein each of the plurality of fasteners include an elongated portion that engages the bottom surface of the video display and a head portion that engages at least one of the at least two channels, the head portion having a circumference that is greater than the circumference of the elongated portion.

6. A method of attaching a soundbar to a video display, comprising:

aligning each of at least two fasteners attached to the video display with a respective channel formed in a top panel of the soundbar and extending along a thickness axis of the soundbar, such that a portion of each of the fasteners is movably disposed within its respective channel and movable along the thickness axis of the video display; and moving the soundbar along the thickness axis of the video display relative to the video display, thereby displacing at least two biasing elements located in the soundbar away from the video display, such that each of the at least two biasing elements disengage a respective retaining surface defined by a lower surface of the top panel adjacent an end of the respective channel of the sound bar and a portion of each of the at least two fasteners is biased into engagement with each respective retaining surface.

7. The method of claim 6, further comprising:

releasing the soundbar, such that the portion of each of the at least two fasteners is located between a respective one of the at least two biasing elements and a respective one of the retaining surfaces.

8. The audio-visual system of claim 1, wherein each of the plurality of fasteners is a thumbscrew having a head that is received within a respective one of the plurality of elongated channels.

9. The audio-visual system of claim 1, wherein each of the plurality of biasing elements comprises a pressure tab biased toward the top panel by a spring.

10. The audio-visual system of claim 9, wherein each pressure tab is movably disposed along a height axis of the soundbar between a retaining position and a depressed position.

11. The audio-visual system of claim 1, wherein each of the plurality of elongated channels includes an opening at a rear portion of the soundbar through which a respective one of the plurality of fasteners is received.

12. The audio-visual system of claim 1, wherein each retaining surface is located adjacent an end portion of a respective one of the plurality of elongated channels.

13. The audio-visual system of claim 1, wherein the soundbar further comprises a release button and at least one locking member that retains at least one of the plurality of fasteners within a respective one of the plurality of elongated channels.

14. The audio-visual system of claim 13, wherein actuation of the release button moves the at least one locking member from a retaining position to a release position that permits movement of the fastener along the respective one of the plurality of elongated channels.

15. The audio-visual system of claim 13, wherein the locking member is spring biased toward the retaining position.

16. The audio-visual system of claim 1, wherein the soundbar further comprises a spring-loaded plunger configured to retain at least one of the fasteners within a retention channel.

17. The audio-visual system of claim 16, wherein movement of the fastener along a respective one of the plurality of elongated channels compresses the spring-loaded plunger during installation of the soundbar.

18. The method of claim 6, wherein moving the soundbar along the thickness axis of the video display includes sliding the soundbar toward a rear portion of the video display until each of the at least two fasteners reach an end portion of a respective channel.

19. The method of claim 7, further comprising moving the soundbar upward relative to the video display to disengage each of the at least two fasteners from the retaining surfaces and sliding the soundbar away from the video display.

20. The method of claim 19, wherein moving the soundbar upward displaces the biasing elements away from the video display.

* * * * *